US011506578B2

(12) United States Patent
Nakajima et al.

(10) Patent No.: US 11,506,578 B2
(45) Date of Patent: Nov. 22, 2022

(54) SMEAR TRANSPORTING APPARATUS, SMEAR SYSTEM, AND SMEAR PREPARING APPARATUS

(71) Applicant: SYSMEX CORPORATION, Kobe (JP)

(72) Inventors: Takayuki Nakajima, Kobe (JP); Tetsuya Oda, Kobe (JP); Hiromi Onomichi, Kobe (JP); Kentaro Tsurumi, Kobe (JP); Seiya Shinabe, Kobe (JP)

(73) Assignee: SYSMEX CORPORATION, Kobe (JP)

(*) Notice: Subject to any disclaimer, the term of this patent is extended or adjusted under 35 U.S.C. 154(b) by 385 days.

(21) Appl. No.: 15/662,584

(22) Filed: Jul. 28, 2017

(65) Prior Publication Data
US 2018/0031454 A1    Feb. 1, 2018

(30) Foreign Application Priority Data

Jul. 29, 2016    (JP) .............................. JP2016-150346

(51) Int. Cl.
*G01N 1/31*    (2006.01)
*G01N 35/00*    (2006.01)
(Continued)

(52) U.S. Cl.
CPC .............. *G01N 1/312* (2013.01); *B05C 13/02* (2013.01); *G01N 1/2813* (2013.01);
(Continued)

(58) Field of Classification Search
CPC ............. G01N 1/312; G01N 35/00029; G01N 35/00722; G01N 35/1016; B05C 13/02
See application file for complete search history.

(56) References Cited

U.S. PATENT DOCUMENTS

2007/0128073 A1    6/2007   Tappen
2007/0148046 A1*   6/2007   Nakaya .................... G01N 1/31
                                                        422/82.05
(Continued)

FOREIGN PATENT DOCUMENTS

CN         1335789 A     2/2002
CN       103713141 A     4/2014
(Continued)

OTHER PUBLICATIONS

The Chinese Office Action dated Oct. 28, 2020 for the counterpart Chinese patent application, With English translation.
(Continued)

*Primary Examiner* — Benjamin R Whatley
(74) *Attorney, Agent, or Firm* — Metrolex IP Law Group, PLLC

(57) ABSTRACT

A smear system includes smear preparing apparatus that prepares a smear slide and a smear transporting apparatus that transports the smear slide to a smear-image capture apparatus. The smear preparing apparatus includes: a smear preparation part that smeares a sample on a slide; and a smear arrangement part that places smear slides in a smear container. The smear transporting apparatus includes: a smear-container transport part that transports the smear container with the smear slides; an identification-information acquisition part that acquires identification information on whether image capturing by the smear-image capture apparatus is necessary, from each of the smear slides accommodated in the smear container positioned on a transport path of the smear-container transport part; and a smear transfer part that transfers the smear slide whose image is to be captured to the smear-image capture apparatus on the basis of the identification information acquired by the identification-information acquisition part.

21 Claims, 15 Drawing Sheets

(51) Int. Cl.
  *G01N 1/28* (2006.01)
  *B05C 13/02* (2006.01)
  *G01N 35/10* (2006.01)

(52) U.S. Cl.
  CPC . *G01N 35/00029* (2013.01); *G01N 35/00722* (2013.01); *G01N 35/00732* (2013.01); *G01N 35/1016* (2013.01); *G01N 2035/00138* (2013.01)

(56) References Cited

U.S. PATENT DOCUMENTS

2013/0020175 A1  1/2013  McKeen et al.
2014/0093424 A1  4/2014  Asahara

FOREIGN PATENT DOCUMENTS

| | | |
|---|---|---|
| CN | 103713142 A | 4/2014 |
| CN | 103713144 A | 4/2014 |
| CN | 104053979 A | 9/2014 |
| JP | H03-57651 U | 6/1991 |
| JP | 2000-74803 A | 3/2000 |
| JP | 2006-47289 A | 2/2006 |
| JP | 2007-178251 A | 7/2007 |
| JP | 2009-518651 A | 5/2009 |
| JP | 2014-70926 A | 4/2014 |
| JP | 2014-70932 A | 4/2014 |
| JP | 2014-70938 A | 4/2014 |
| JP | 2016-99324 A | 5/2016 |
| WO | 2007/067847 A2 | 6/2007 |
| WO | 2007/067847 A3 | 6/2007 |
| WO | 2013/071358 A2 | 5/2013 |
| WO | 2016/084689 A1 | 6/2016 |
| WO | 2016084377 A1 | 6/2016 |

OTHER PUBLICATIONS

The extended European search report dated May 6, 2022 in a counterpart European patent application.

* cited by examiner

SMEAR TRANSPORTING APPARATUS, SMEAR SYSTEM, AND SMEAR PREPARING APPARATUS

CROSS REFERENCE TO RELATED APPLICATIONS

This application claims priority from prior Japanese Patent Application No. 2016-150346 filed with the Japan Patent Office on Jul. 29, 2016, the entire contents of which are incorporated herein by reference.

BACKGROUND

The disclosure relates to a smear transporting apparatus, a smear system, and a smear preparing apparatus.

Heretofore, there has been known a smear preparing apparatus which prepares a smear slide by smearing a sample on a microscope slide (see, for example, Published Japanese Translation of PCT International Application No. 2009-518651 (Patent Literature 1)).

As illustrated in FIG. 15, smear preparing apparatus 300 described in Patent Literature 1 is configured such that a smear slide prepared by staining blood smeared on a microscope slide is accommodated in each of recesses of basket 301, and then basket 301 filled with such smear slides is transferred to storage area 302.

The above-described smear slides include ones to be visually observed by the user using a microscope, and also ones whose images are to be automatically captured by a smear imaging apparatus. Hence, a smear container accommodating smear slides, such as the basket described in Patent Literature 1, sometimes contains a mixture of smear slides for visual observation whose images are not to be captured and smear slides whose images are to be captured.

It has been demanded to, even in the case where a smear container contains a mixture of smear slides whose images are to be captured and smear slides whose images are not to be captured, efficiently identify the smear slides whose images are to be captured among the smear slides in the smear container, and automatically capture images of the identified smear slides.

SUMMARY

One or more embodiments of smear system may include: a smear preparing apparatus that prepares a smear slide on which a sample is smeared; and a smear transporting apparatus that transports the smear slide prepared by the smear preparing apparatus to a smear-image capture apparatus. The smear preparing apparatus may include: a smear preparation part that prepares the smear slide by smearing a sample on a slide; and a smear arrangement part that places, in a smear container, smear slides including a smear slide whose image is to be captured by the smear-image capture apparatus and a smear slide whose image is not to be captured by the smear-image capture apparatus. The smear transporting apparatus may include: a smear-container transport part that transports the smear container with the smear slides placed by the smear arrangement part; an identification-information acquisition part that acquires identification information on whether image capturing by the smear-image capture apparatus is necessary, from each of the smear slides accommodated in the smear container positioned on a transport path of the smear-container transport part; and a smear transfer part that picks the smear slide whose image is to be captured from the smear container and transfers the picked smear slide to the smear-image capture apparatus on the basis of the identification information acquired by the identification-information acquisition part.

One or more embodiments of smear transporting apparatus that transports a smear slide on which a sample is smeared to a smear-image capture apparatus, the smear transporting apparatus may include: a smear-container transport part that transports a smear container accommodating smear slides including a smear slide whose image is to be captured by the smear-image capture apparatus and a smear slide whose image is not to be captured by the smear-image capture apparatus; an identification-information acquisition part that acquires identification information on whether image capturing by the smear-image capture apparatus is necessary, from each of the smear slides accommodated in the smear container positioned on a transport path of the smear-container transport part; and a smear transfer part that picks the smear slide whose image is to be captured from the smear container and transfers the picked smear slide to the smear-image capture apparatus on the basis of the identification information acquired by the identification-information acquisition part.

One or more embodiments of smear preparing apparatus may include: a smear preparation part that prepares a smear slide by smearing a sample on a slide; an identification-information providing part that provides, on a slide, image-capturing necessity identification information on whether image capturing by a smear-image capture apparatus is necessary; and a smear arrangement part that places, in a smear container, smear slides provided with the image-capturing necessity identification information.

DETAILED DESCRIPTION

Hereinafter, embodiments are explained in detail with reference to the accompanying drawings. Note that the invention is not limited to these illustrative examples, and is intended to include meaning defined by the claims and equivalent to the claims as well as all modifications within the scope of the claims.

[Smear Analysis System]

Figure 1:
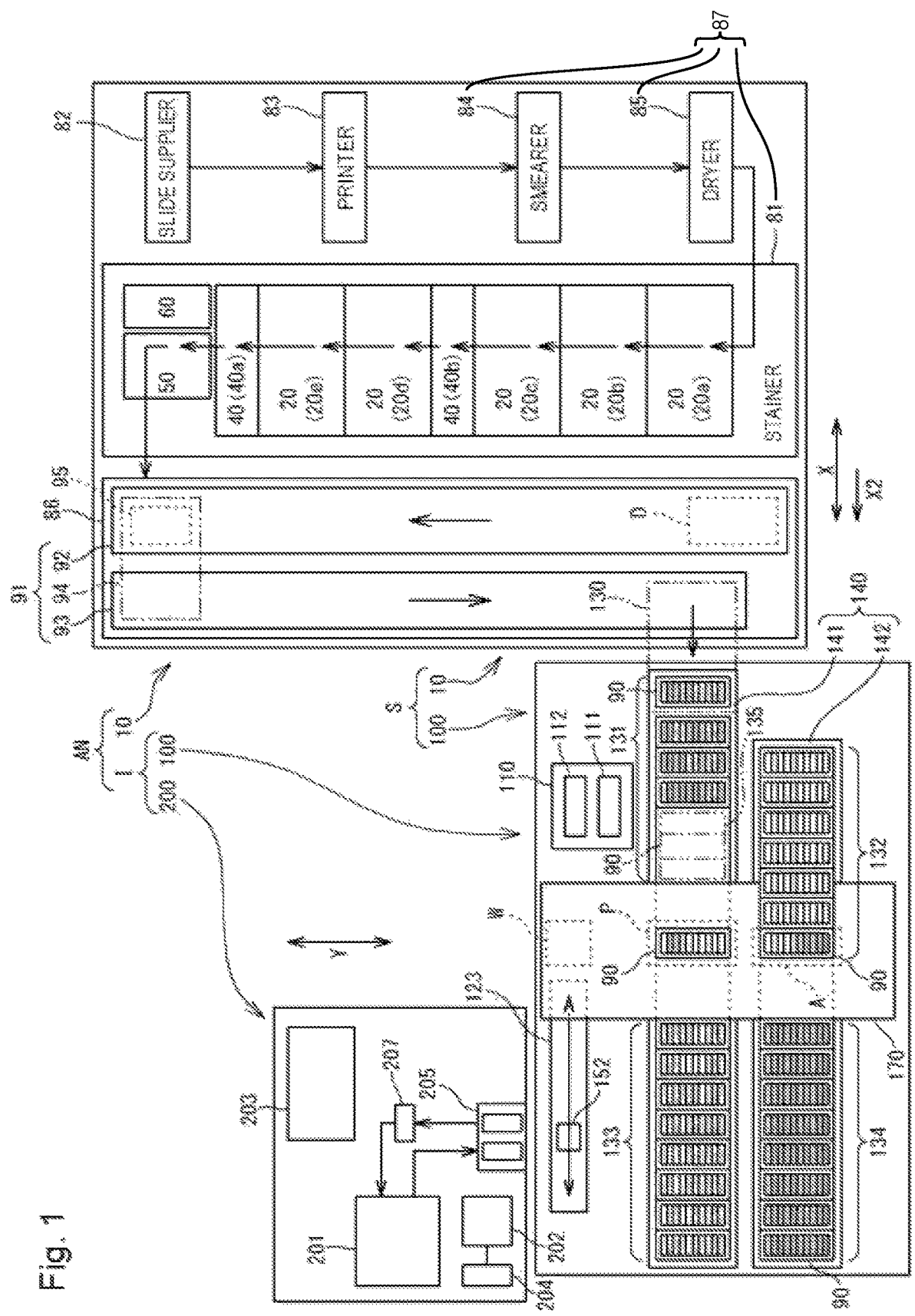
FIG. 1 is a plan explanatory diagram of one embodiment of a smear analysis system.

As illustrated in FIG. 1, smear analysis system AN including a smear transporting apparatus according to one embodiment includes smear preparing apparatus 10, smear transporting apparatus 100, and smear-image capture apparatus 200. Smear preparing apparatus 10 prepared and supplies a smear slide to smear transporting apparatus 100. Smear transporting apparatus 100 supplies the smear slide to smear-image capture apparatus 200. Smear preparing apparatus 10, smear transporting apparatus 100, and smear-image capture apparatus 200 are capable of automatically performing a series of operations from preparation of smear slides with smeared samples such as blood to image capturing of the samples. Note that, in this Description, smear preparing apparatus 10 and smear transporting apparatus 100 constitute smear system S. In addition, a system or apparatus constituted by smear transporting apparatus 100 and smear-image capture apparatus 200 is referred to as smear image capture system I. Although this smear image capture system I is constituted by smear transporting apparatus 100 and smear-image capture apparatus 200, which are independent of each other in embodiments to be described later, it is also possible to constitute smear image capture system I as an apparatus integrated with smear transporting apparatus 100 and smear-image capture apparatus 200. For example, principal components of each apparatus can be stored in the same casing. Smear preparing apparatus 10 and smear image capture system I constitute the smear analysis system.

Note that this Description explains an X direction illustrated in FIG. 1 as a right-left direction, a Y direction as a front-rear direction, and a Z direction as a top-bottom direction. Moreover, a lower edge side in FIG. 1 indicates a front side, and an upper edge side therein indicates a rear side. Smear preparing apparatus 10 is disposed at a right side portion of smear transporting apparatus 100, and smear transporting apparatus 100 is disposed at a front side of smear-image capture apparatus 200. Smear transporting apparatus 100 is disposed in such a manner as to partially overlap with the front side of smear-image capture apparatus 200. Furthermore, in this Description, the word "traverse (ly)" may be used to mean the right-left direction, and the word "longitudinal" may be used to mean the front-rear direction.

[Smear Preparing Apparatus]

Figure 2A:
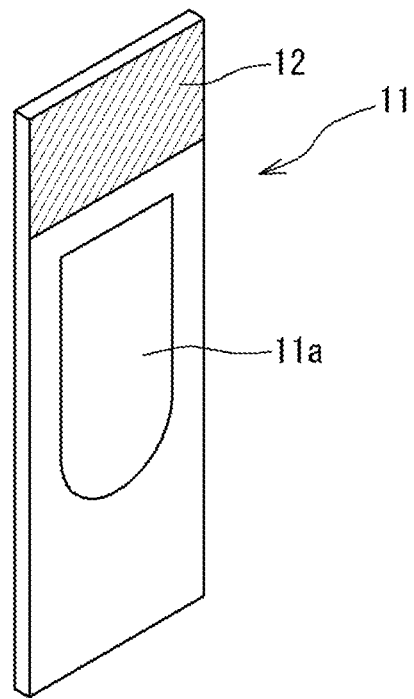
FIGS. 2A and 2B are explanatory perspective views of a smear slide.
Figure 2B:
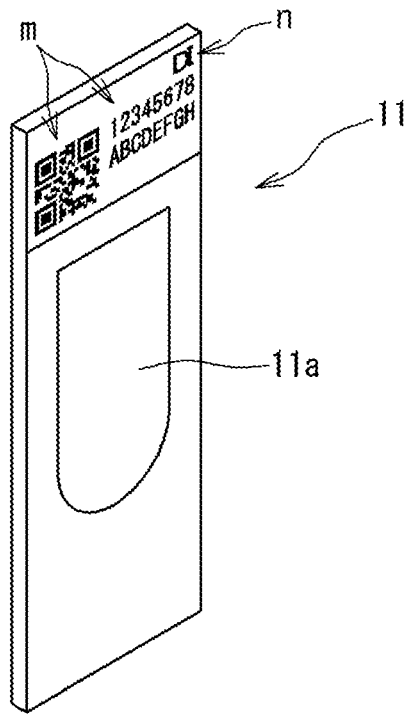

Smear preparing apparatus 10 according to this embodiment is an apparatus which prepares a smear slide 11 by performing processes such as smearing, drying, and staining on blood, which is a sample of a subject, on a microscope slide. As illustrated in FIGS. 2A and 2B, smear slide 11 is formed of a rectangular glass plate, and central section 11a thereof is smeared with a sample. An upper portion at one end portion in a longitudinal direction of smear slide 11 is provided with frost section 12 which is a region where identification information to be described later is typed (see FIG. 2A). Frost section 12 is a region coated with a synthetic resin or the like, so that a processing allowing the typing is performed. In this Description, smear slide 11 refers to not only microscope slides after the sample smearing process is completed in smear preparing apparatus 10, but also microscope slides provided with frost section 12 to be supplied to smear preparing apparatus 10 for the smearing process.

As illustrated in FIG. 2B, the identification information to be typed or printed on frost section 12 includes sample identification information m and image-capturing necessity identification information n. Sample identification information m is information for identifying a sample, such as sample number, date, reception number, and the name of a subject. Sample identification information m is typed on frost section 12 in such forms as a barcode, letters, and signs. Image-capturing necessity identification information n is information for identifying whether or not a sample is one whose image is to be captured by smear-image capture apparatus 200. Whether a sample is a sample whose image is to be captured by smear-image capture apparatus 200 or a sample to be visually tested under a microscope may have been inputted to a host computer in advance when a test is conducted. It is also possible to incorporate image-capturing necessity identification information n together with sample identification information m in, for example, one barcode. On the other hand, image-capturing necessity identification information n can also be typed on frost section 12 separately from sample identification information m. In the latter case, as image-capturing necessity identification information n, it is desirable to use letters, signs, or the like which are not used for sample identification information m. Examples of image-capturing necessity identification information n can include various letters, for example, alphabets such as A, B, and C, and various signs such as ▲, ●, ■, and ◆, but are not limited thereto. Even in the case where alphabets are used as sample identification information m, a sign obtained by overlaying or combining two alphabet letters with each other may be used as image-capturing necessity identification information n, for the distinction. Note that although sample identification information m is normally information for identifying a sample, it is also possible to inquire of an external host computer whether image capturing of the sample is necessary or not on the basis of this sample identification information m to thereby determine whether smear slide 11 is one whose image is to be captured or not on the basis of a result obtained from the host computer. Thus, this sample identification information m is also included in "identification information on whether image capturing by the smear-image capture apparatus is necessary or not".

Figure 3:
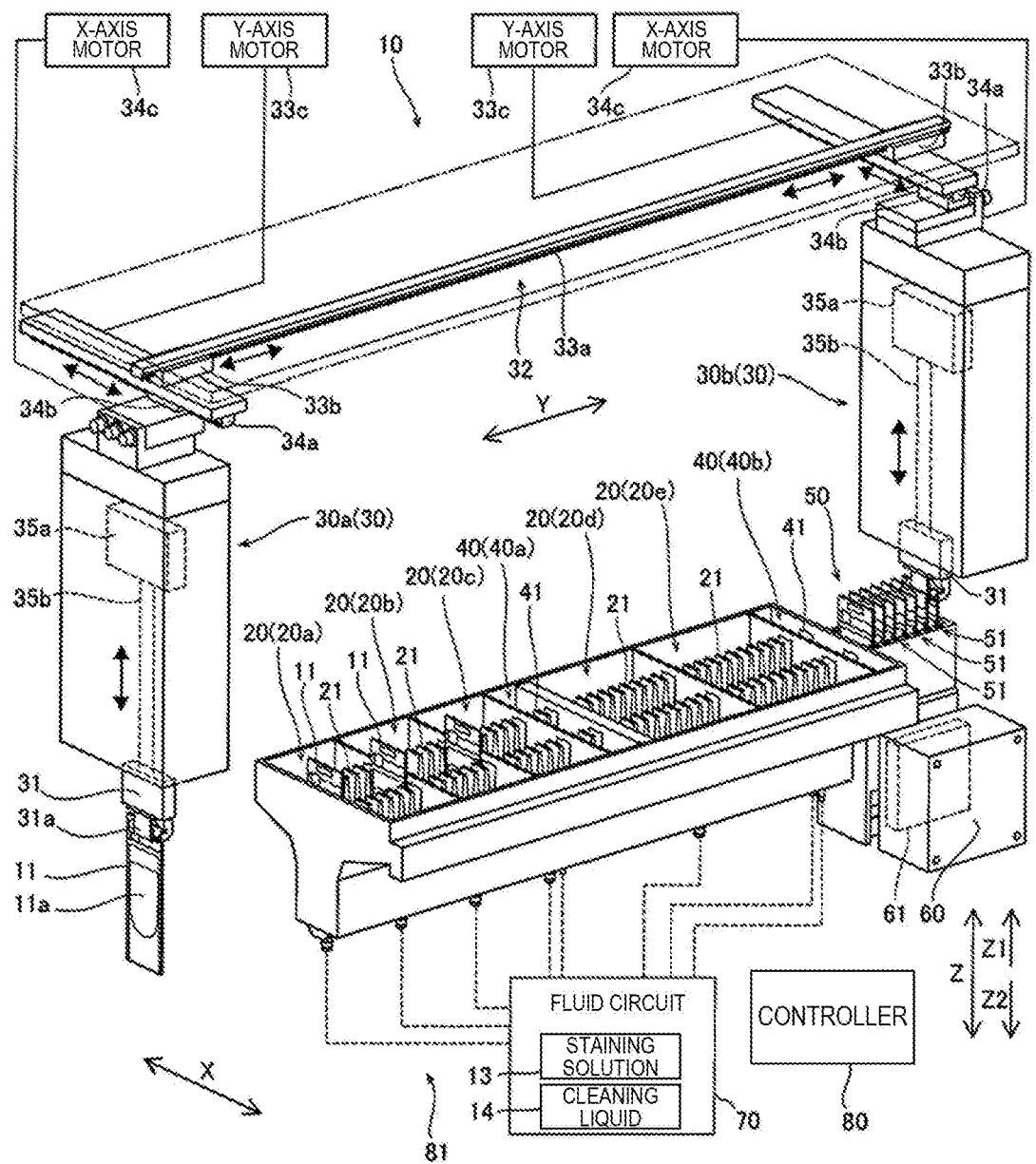
FIG. 3 is an explanatory perspective view of stain chambers and a transfer unit of a smear preparing apparatus.

As illustrated in FIG. 1 or 3, smear preparing apparatus 10 includes stain chambers 20, transfer unit 30, cleaning chambers 40, drying chamber 50, blower unit 60, slide supplier 82, printer 83, smearer 84, dryer 85, and slide storage 86. Stain chambers 20, cleaning chambers 40, drying chamber 50, and blower unit 60 constitute stainer 81 in smear preparing apparatus 10. In this embodiment, smearer 84, stainer 81, and dryer 85 constitute a smear preparation part 87 which prepares a smear slide 11 by smearing a sample on a slide. Moreover, printer 83 constitutes an identification-information providing part which provides identification information on a smear slide.

Smear preparing apparatus 10 further includes fluid circuit 70 for supplying and discharging staining solution 13 and cleaning liquid 14 to and from stain chambers 20 and cleaning chambers 40, respectively; and controller 80 for controlling the operations of transfer unit 30, blower unit 60, and so forth. Controller 80 is a computer including unillustrated CPU, memory, and so forth.

Slide supplier 82 stores numerous smear slides 11 yet to be used before a sample is smeared. Slide supplier 82 supplies printer 83 with smear slides 11 one by one before smearing.

Printer 83 can type or print various information such as the sample identification information, the image-capturing necessity identification information, and so forth on frost section 12 which is the region of smear slide 11 where typing is performed. Printer 83 transfers typed smear slide 11 to smearer 84.

Smearer 84 aspirates a sample with an unillustrated sample aspiration mechanism, smears the sample on central section 11a of smear slide 11 transferred from printer 83. After the smearing process, smearer 84 transfers smear slide 11 to dryer 85.

Dryer 85 receives smear slide 11 with the smeared sample from smearer 84, and has a function of drying central section 11a with the smeared sample.

In stainer 81, smear slide 11 smeared with the sample dried by dryer 85 is stained in stain chambers 20a, 20b, 20c, 20d, 20e and cleaned in cleaning chambers 40a, 40b. Then, smear slide 11 is dried in drying chamber 50. When the staining of smear slide 11 is completed, stained smear slide 11 is transferred to slide storage 86. Transfer unit 30 transfers smear slide 11 between these components.

Stain chambers 20 are each formed in a shape of container in which a staining solution is stored so that smear slide 11 with the smeared sample can be immersed therein. Moreover, each of cleaning chambers 40 is also formed in a shape of container in which a cleaning liquid is stored so that stained smear slide 11 can be immersed therein. In smear preparing apparatus 10 according to this embodiment, three stain chambers 20a, 20b, 20c, cleaning chamber 40a, two stain chambers 20d, 20e, and cleaning chamber 40b are disposed in this order along the Y-axis direction. These chambers are integrally formed as a single chamber using a synthetic resin. Note that the numbers of stain chambers 20 and cleaning chambers 40 should be selected as appropriate in accordance with the content of the staining process, the number of steps, and so on. The numbers are not particularly limited.

In stain chambers 20 and cleaning chambers 40, partitions 21, 41 are provided respectively. Smear slide 11 is inserted between partitions 21 next to each other or between partitions 41 next to each other, and held or positioned by these partitions 21, Transfer unit 30 is provided to grip and transfer smear slide 11 with the smeared sample. Transfer unit 30 is capable of putting each smear slide 11 one by one in and out stain chambers 20 or cleaning chambers 40. As the configuration of transfer unit 30 for putting each smear slide 11 in and out one by one in this manner, various configurations can be adopted. In this embodiment, as illustrated in FIG. 3, a three-axis coordinate robot is adopted which is movable in horizontal directions (X direction and Y direction) and in the top-bottom direction (Z direction) or vertical direction, and includes hand members 31 for gripping smear slide 11. As hand member 31, it is possible to use, for example, an open-close mechanism capable of grasping smear slide 11 from both sides, or an aspiration mechanism which grasps smear slide 11 by suction on a predetermined spot thereof at a negative pressure.

Transfer unit 30 includes first transfer part 30a and second transfer part 30b. Both of first transfer part 30a and second transfer part 30b are disposed above (Z1 direction) stain chambers 20 and cleaning chambers 40. First transfer part 30a and second transfer part 30b are movable in the horizontal directions (X direction and Y direction) independently of each other by movement mechanism 32.

Movement mechanism 32 includes Y-axis rail 33a and Y-axis sliders 33b located in the Y direction, X-axis rails 34a and X-axis sliders 34b located in the X direction, Y-axis motors 33c, and X-axis motors 34c. As Y-axis motors 33c and X-axis motors 34c, for example, stepping motors and servomotors can be adopted.

Y-axis sliders 33b are attached to a bottom surface side (Z2 direction) of Y-axis rail 33a, and movable along Y-axis rail 33a. Y-axis motors 33c move Y-axis sliders 33b in the Y direction with an unillustrated transmission mechanism. As the transmission mechanism, for example, a belt-pulley mechanism, a rack-pinion mechanism, or the like can be used.

X-axis rails 34a are fixed to bottom surfaces of Y-axis sliders 33b. X-axis sliders 34b are attached to bottom surface sides (Z2 direction) of X-axis rails 34a, and are movable along X-axis rails 34a. X-axis motors 34c move X-axis sliders 34b in the X direction with an unillustrated transmission mechanism.

Y-axis sliders 33b, X-axis rails 34a, X-axis sliders 34b, X-axis motors 34c, and Y-axis motors 33c are respectively provided in pairs. To bottom surface sides of the pair of X-axis sliders 34b, first transfer part 30a and second transfer part 30b are attached, respectively. First transfer part 30a and second transfer part 30b are movable independently of each other in the X direction along separate X-axis rails 34a. Moreover, first transfer part 30a and second transfer part 30b are movable independently of each other in the Y direction along the same Y-axis rail 33a.

The configurations of first transfer part 30a and second transfer part 30b are the same. First transfer part 30a and second transfer part 30b each include Z-axis motor 35a and transmission mechanism 35b for elevating and lowering hand member 31. Z-axis motor 35a is capable of elevating and lowering hand member 31 with transmission mechanism 35b.

Hand member 31 includes a pair of gripping plates 31a. Hand member 31 is capable of gripping one smear slide 11 in a thickness direction from both sides with the pair of gripping plates 31a. The pair of gripping plates 31a grip smear slide 11 by respectively coming into contact with a front surface and a back surface of smear slide 11. Of the pair of gripping plates 31a, gripping plate 31a at the back surface side is capable of moving smear slide 11 in the thickness direction. Gripping plates 31a can be moved using an actuator, for example, an air cylinder, a motor, a solenoid, or the like.

Drying chamber 50 is disposed in such as manner as to be substantially aligned with stain chambers 20 and cleaning chambers 40 along the Y direction in which stain chambers 20 and cleaning chambers 40 are arranged. Drying chamber 50 is provided to dry smear slide 11 having been subjected to the staining process and the cleaning process. Drying chamber 50 is partitioned by partitions 51, and is capable of holding smear slide 11 between partitions 51 next to each other. Inside drying chamber 50, an air passage (unillustrated) is formed. This air passage is connected to blower unit 60.

Blower unit 60 is provided to supply hot air to smear slide 11 held in drying chamber 50. Heater 61 for heating air is provided between blower unit 60 and drying chamber 50.

Figure 4:
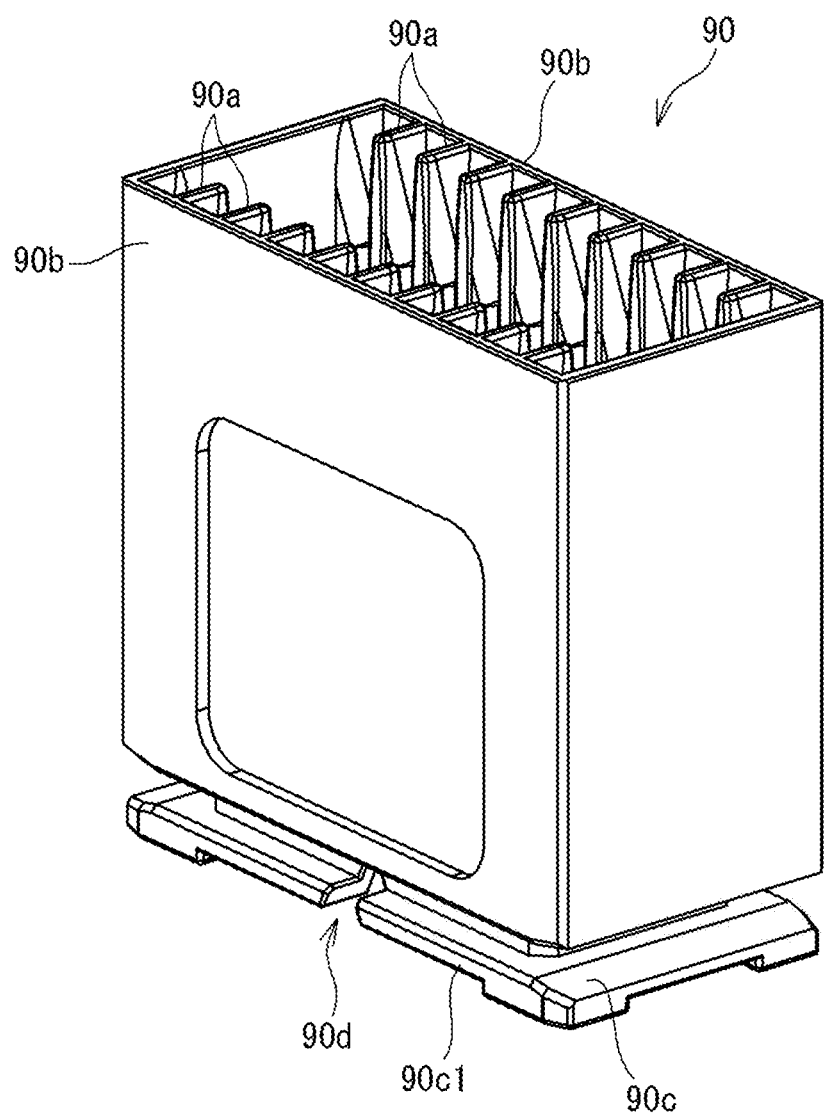
FIG. 4 is an explanatory perspective view of a smear container.

After the staining, cleaning, and drying processes are completed, transfer unit 30 transfers smear slide 11 to slide storage 86. Slide storage 86 includes magazine transport part 91 which transports slide magazine 90 serving as a smear container. Slide magazine 90 is capable of holding stained smear slides 11. As illustrated in FIG. 4, slide magazine 90 has a box shape whose top surface is opened, and partitions 90a are provided inside slide magazine 90. Partitions 90a are formed on inner surfaces of longitudinal walls 90b opposite to each other. Partitions 90a formed on the inner surface of one of walls 90b are formed at positions opposite to partitions 90a formed on the inner surface of the other wall 90b at the opposite side. In this embodiment, slide magazine 90 can accommodate ten smear slides 11.

Figure 5:
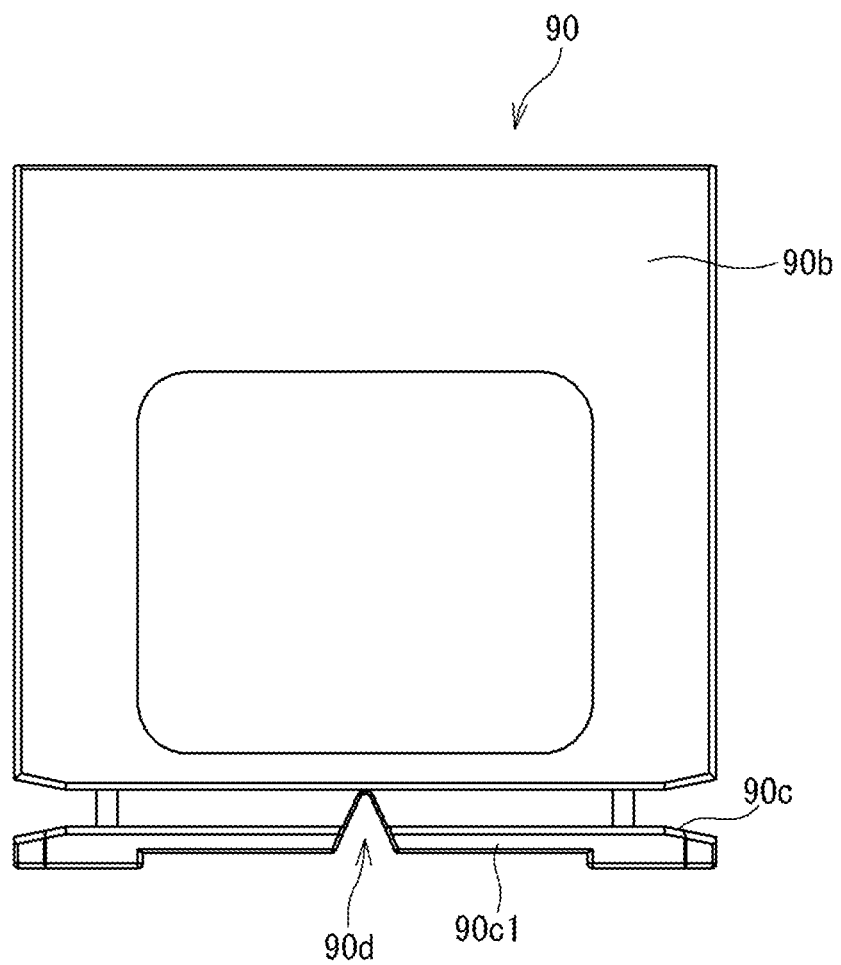
FIG. 5 is an explanatory front view of the smear container.

In base 90c of slide magazine 90, triangular notch 90d is formed which engages with guide rail 145 of smear transporting apparatus 100 to be described later. As illustrated in FIG. 5, this notch 90d is a triangular notch when slide magazine 90 is seen in a front view of wall 90b in a longitudinal direction of slide magazine 90. Notch 90d is formed across the entire length direction of a shorter side of base 90c.

Magazine transport part 91 includes magazine carry-in path 92 capable of storing empty slide magazines 90, magazine carry-out path 93 capable of storing slide magazines 90 storing smear slides 11, and traverse transfer mechanism 94 extending from magazine carry-in path 92 to magazine carry-out path 93. In magazine transport part 91, when the user sets empty slide magazine 90 in introduction section D of magazine carry-in path 92, slide magazine 90 is automatically transported toward smear storage position 95.

After drying chamber 50 completes the drying process, transfer unit 30 grasps and raises smear slide 11, and stores smear slide 11 in an empty storage section of slide magazine 90 disposed at smear storage position 95. When the storage section is filled, traverse transfer mechanism 94 traversely transfers slide magazine 90 from magazine carry-in path 92 to magazine carry-out path 93. Slide magazine 90 traversely transferred to magazine carry-out path 93 is automatically transported frontward. When slide magazine 90 is transported to the frontmost side, traverse transfer unit 130 transfers slide magazine 90 to magazine buffer region 131, which is a first supply region of smear transporting apparatus 100. In this embodiment, transfer unit 30 functions as a "smear arrangement part which places, in a smear container, smear slides printed with identification information."

[Smear Transporting Apparatus]

Smear transporting apparatus 100 includes: smear-container transport part 140 for transporting slide magazine 90, which is a smear container, accommodating smear slides 11; and smear transfer part 170. Smear transfer part 170 picks, picks up, takes out, grips or lifts smear slide 11 accommodated in slide magazine 90 transported by smear-container transport part 140, and supplies smear slide 11 to the smear-image capture apparatus after smear slide 11 thus taken out is put in transport case 152 to be described later.

In this embodiment, smear-container transport part 140 has two rows of front and rear transport units, that is, first transport unit 141 (first transport part) located on a rear side of smear transporting apparatus 100 and second transport unit 142 (second transport part) located in front of first transport unit 141. Each of first transport unit 141 and second transport unit 142 includes a belt conveyor including belts 143 and driver 144 which drives these belts 143. First transport unit 141 and second transport unit 142 transport slide magazines 90 in an X2 direction (see FIGS. 1 and 9).

As illustrated in FIG. 1, first transport unit 141 and second transport unit 142 can be divided into four regions according to the state of slide magazine 90. Specifically, first transport unit 141 and second transport unit 142 can be divided into: magazine buffer region 131 as a first supply region, magazine set region 132 as a second supply region, first magazine storage region 133 as a first storage region, and second magazine storage region 134 as a second storage region. Among these four regions, magazine set region 132 and second magazine storage region 134 belong to second transport unit 142. Meanwhile, magazine buffer region 131 and first magazine storage region 133 belong to first transport unit 141. First magazine storage region 133 and second magazine storage region 134 constitute a storage for storing slide magazines 90 which serve as the smear containers.

After smear preparing apparatus 10 completes the smearing process, smear slides 11 are stored in slide magazine 90 serving as a first smear container. Traverse transfer unit 130 transfers the slide magazine to magazine buffer region 131. First magazine storage region 133 is a region that stores slide magazine 90 as the first smear container which stores only smear slides 11 to be visually tested under a microscope, and from which smear slides 11 whose images are to be captured by smear-image capture apparatus 200 have been picked up. Magazine set region 132 is a region where empty slide magazines 90 set by the user are disposed. Second magazine storage region 134 is a region that stores slide magazine 90 storing smear slides 11 whose images have been captured by smear-image capture apparatus 200. Note that, in this embodiment, interrupting-smear-container set region 135 which is accessible to the user, and in which slide magazine 90 accommodating smear slide 11 prepared by this the user is set is located at a left side portion in magazine buffer region 131. Specifically, on a transport path where smear containers are transported, interrupting-smear-container set region 135 is located between magazine buffer region 131 where smear containers from smear preparing apparatus 10 are received and a position where an identification-information acquisition part to be described later acquires identification information.

Second transport unit 142 transports empty slide magazine 90 serving as a second smear container, which the user sets in magazine set region 132, to smear storage position A. Smear slides 11 whose images have been captured by smear-image capture apparatus 200 are sequentially accommodated in slide magazine 90 as the second smear container at this smear storage position A. When slide magazine 90 at smear storage position A is filled, second transport unit 142 transports slide magazine 90 filled with smear slides 11 from smear storage position A to second magazine storage region 134. Then, second transport unit 142 transports empty slide magazine 90 positioned on a left end of magazine set region 132 to smear storage position A.

On the other hand, first transport unit 141 transports, to smear pickup position P, slide magazine 90 as the first smear container which is received from smear preparing apparatus 10 and disposed in magazine buffer region 131. At this smear pickup position P, handling member 120 of smear transfer part 170 sequentially picks up smear slides 11 as described later. Smear slides 11 thus picked up are sorted into smear slides 11 whose images are to be captured by smear-image capture apparatus 200, and smear slides 11 whose images are not to be captured by smear-image capture apparatus 200. After the sorting of smear slides 11 is completed, slide magazine 90 is transported from smear pickup position P to first magazine storage region 133. Slide magazine 90 positioned at first magazine storage region 133 stores only smear slides 11 whose images are not to be captured by smear-image capture apparatus 200. These smear slides 11 are to be visually tested under a microscope.

In this embodiment, slide magazine 90 accommodating smear slides 11 is transported from smear preparing apparatus 10 to smear pickup position P. Smear slides 11 include ones whose images are to be captured by smear-image capture apparatus 200, and ones whose images are not to be captured. Hence, slide magazine 90 transported to smear pickup position P normally contains a mixture of the two types of smear slides 11. Nevertheless, in this embodiment, even if slide magazine 90 contains such a mixture, smear slides 11 whose images have been captured by smear-image capture apparatus 200 and smear slides 11 whose images are not captured by smear-image capture apparatus 200 are accommodated in different slide magazines 90, that is, slide magazine 90 as the first smear container and slide magazine 90 as the second smear container. Then, these slide magazines are stored in different regions. To enhance the resolution when an image is captured by smear-image capture apparatus 200, an immersion oil is applied to a sample such as blood smeared on smear slide 11 in some cases. Since smear slides 11 whose images have been captured are accommodated in slide magazine 90 different from slide magazine 90 accommodating smear slides 11 whose image has yet to be captured, this makes it possible to suppress the immersion oil contamination of smear slides 11 whose images have yet to be captured. Thus, when smear slide 11 whose image is not to be captured is visually observed, the user can visually observe smear slide 11 not contaminated with the oil by taking out slide magazine 90 accommodating the smear slide from first magazine storage region 133, thereby enhancing smear slide 11 handleability.

Slide magazine 90 positioned in second magazine storage region 134 stores smear slides 11 whose images have been captured by smear-image capture apparatus 200. As described above, since an immersion oil is sometimes applied to smear slide 11 when an image is captured, the oil applied to smear slide 11 may adhere to slide magazine 90. For this reason, it is desirable to divide slide magazines 90 used in the front-side row from slide magazines 90 used in the rear-side row. It is desirable to use slide magazines 90 which have a possibility of the oil contamination in the front-side row, and use slide magazines 90 which have no possibility of the oil contamination in the rear-side row. In this case, slide magazines 90 to be set in magazine set region 132 are slide magazines 90 storing smear slides 11 after image capturing, disposed in second magazine storage region 134, and then emptied by completing the processing on these smear slides 11. On the other hand, slide magazines 90 positioned in first magazine storage region 133 and then emptied by taking out smear slides 11 having been stored for the visual test under a microscope are set in introduction section D of magazine carry-in path 92 of smear preparing apparatus 10. Using slide magazines 90 differently in this manner makes it possible to efficiently clean these slide magazines 90. Specifically, slide magazines 90 disposed in second magazine storage region 134 are desirably set to be cleaned frequently because the possibility of the oil contamination is high. On the other hand, slide magazines 90 disposed in first magazine storage region 133 can be set to be cleaned less frequently because the slide magazines have no possibility of the oil contamination. Slide magazines 90 used in the front-side row can be easily distinguished from slide magazines 90 used in the rear-side row, for example, by changing the colors or in other ways.

As described above, magazine buffer region 131 in this embodiment has interrupting-smear-container set region 135, which is a region accessible to the user. Interrupting-smear-container set region 135 is located in a region at the left end portion in magazine buffer region 131, that is, a region at smear pickup position P side in magazine buffer region 131. Interrupting-smear-container set region 135 is a region where no slide magazine 90 is normally present. After smear preparing apparatus 10 supplies slide magazines 90 to magazine buffer region 131, first transport unit 141 sequentially transports slide magazines 90 to the left, that is, toward smear pickup position P.

Nevertheless, the user may manually prepare smear slide 11 instead of smear preparing apparatus 10 to capture an image with smear-image capture apparatus 200 for the analysis. To prepare smear slide 11 with smear preparing apparatus 10, a certain amount of a sample is required. However, it may be difficult to collect the certain amount of a sample from such a subject as an infant, for example. In such a case, smear preparing apparatus 10 cannot automatically prepare smear slide 11. As a result, the user manually prepares smear slide 11 using a sample collected from a subject. Moreover, it is also conceivable that when a sample needs to be analyzed quickly using smear-image capture apparatus 200, the user manually prepares smear slide 11 using a sample collected from a subject.

Interrupting-smear-container set region 135 is a region where slide magazine 90 accommodating smear slide 11 manually prepared as described above is set. First transport unit 141 transports slide magazine 90 set in interrupting-smear-container set region 135 to smear pickup position P.

Interrupting-smear-container set region 135 is normally set such that no slide magazine 90 is present so as to set slide magazine 90 accommodating manually-prepared smear slide 11 in interrupting-smear-container set region 135.

Figure 6:
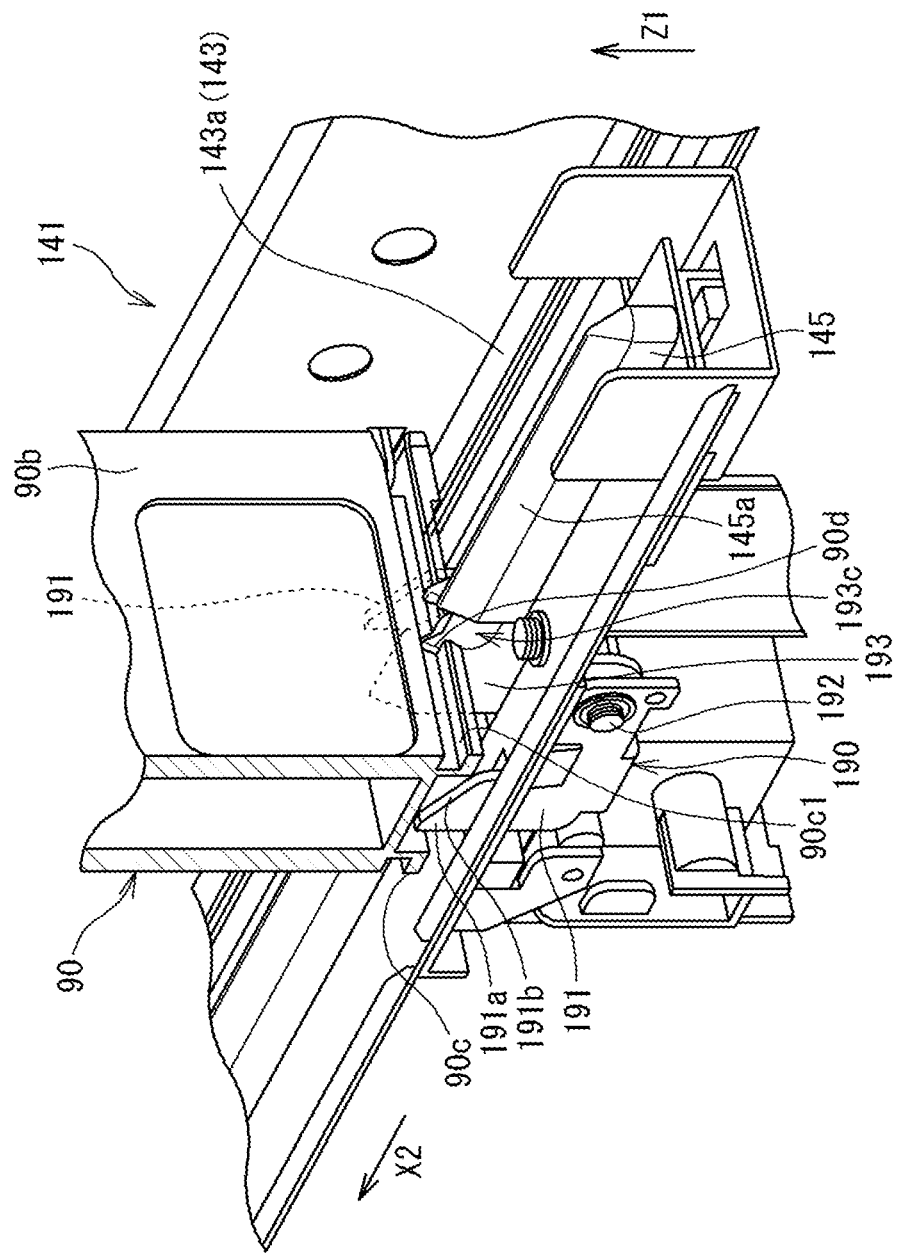
FIG. 6 is an explanatory perspective view of principal components of a first transport unit.

FIG. 6 is an explanatory partial perspective view of first transport unit 141 positioned in interrupting-smear-container set region 135. As described above, first transport unit 141 includes a belt conveyor including belts 143 and driver 144 which drives these belts 143 (see FIG. 9). Belts 143 are provided in pair along the transport direction (X2 direction) of slide magazine 90. In FIG. 6, only one belt (rear-side belt) 143a is illustrated to facilitate the understanding. Substantially at the center in a width direction of the pair of belts 143, guide rail 145 is provided which guides the movement of slide magazine 90. Tip end portion 145a, which is an end portion in an upward direction (Z1 direction) of guide rail 145, has a tapered shape. In more details, the shape of a traverse cross section of tip end portion 145a is triangular, and corresponds to triangular notch 90d formed in base 90c of slide magazine 90 described above. Slide magazine 90 is transported while guided by this tip end portion 145a of guide rail 145 with tip end portion 145a being fitted in notch 90d of base 90c.

Detector 190 is provided within the pair of belts 143 in the width direction. Detector 190 has a pair of plate-shaped swing pieces 191. Swing pieces 191 are provided within the pair of belts 143 in the width direction. Swing pieces 191 are swingable about the same shaft 192. Tip end portion 191a, which is an end portion in an upward direction (Z1 direction) of each of swing pieces 191, has inclination surface 191b ascending in transport direction X2 of slide magazine 90. In a state not in contact with slide magazine 90, swing pieces 191 are biased by an unillustrated spring such that tip end portions 191a are directed upward (see FIG. 6).

Detector 190 is provided at a position immediately before interrupting-smear-container set region 135 when seen in transport direction X2 of slide magazine 90.

Figure 7:
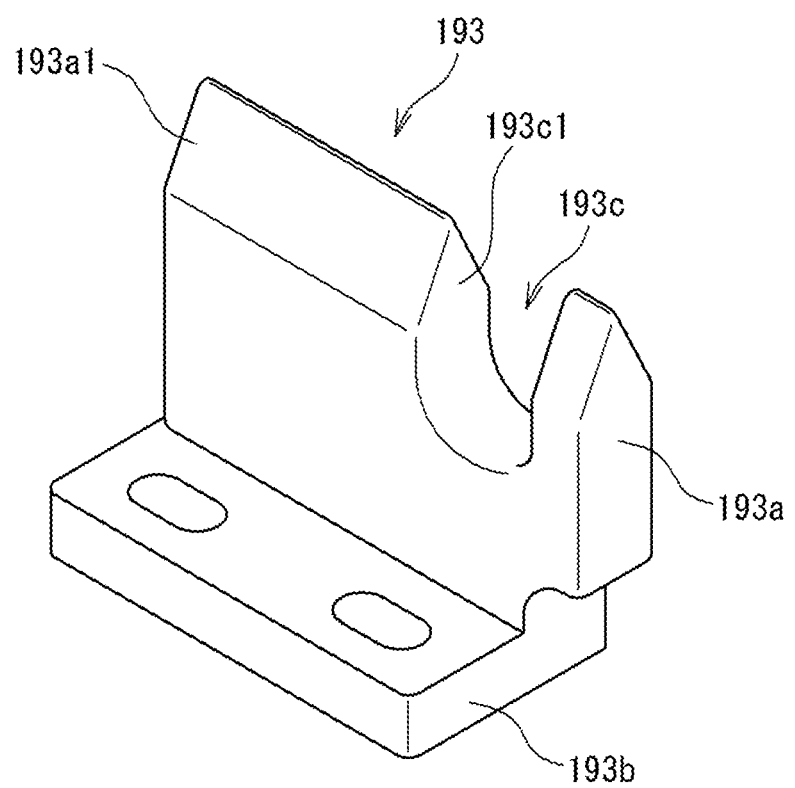
FIG. 7 is an explanatory perspective view of a stopper.

At a middle position between paired plate-shaped swing pieces 191 (middle position in the width direction of belts 143), stopper 193 is provided which is capable of stopping the movement of slide magazine 90. As illustrated in FIG. 7, stopper 193 includes main body 193a with a shape partially cut along a longitudinal direction of guide rail 145, and base 193b extending in the width direction of belts 143 from a bottom end of main body 193a. The shape of a traverse cross section of tip end portion 193a1, which is an end portion in an upward direction (Z1 direction) of main body 193a, has the same tapered shape as tip end portion 145a of guide rail 145. Normally, stopper 193 and guide rail 145 are positioned substantially on the same straight line. Accordingly, tip end portion 193a1 of main body 193a of stopper 193 is fitted in notch 90d of slide magazine 90, so that this slide magazine 90 can pass through the top of this stopper 193 without being interrupted by stopper 193. Notch 193c is formed in main body 193a of stopper 193. Notch 193c is formed at such a position that notch 193c is slightly shifted to an end portion from the center in a longitudinal direction of main body 193a. Notch 193c is formed to a size sufficient to accommodate long frame 90c1 of base 90c of slide magazine 90.

When slide magazine 90 passes through swing pieces 191, long frame 90c1 at a leading side of base 90c of slide magazine 90 comes into contact with inclination surfaces 191b of swing pieces 191, and thereby pushes these swing pieces 191 downward against the biasing force of the aforementioned spring. When long frame 90c1 at the leading side of base 90c passes through inclination surfaces 191b of swing pieces 191, the contact state between this long frame 90c1 and inclination surfaces 191b ends. Hence, swing pieces 191 return to the original position, that is, to the state where tip end portions 191a are directed upward, by the action of the spring. In this event, tip end portions 191a are located in recess 90e of base 90c of slide magazine 90. In addition, long frame 90c1 at a rear side of base 90c (the rear side in the transport direction (X2 direction) of base 90c) is located in notch 193c of stopper 193. From these states, when slide magazine 90 further moves toward smear pickup position P, long frame 90c1 at the rear side of base 90c comes into contact with inclination surfaces 191b of swing pieces 191, and thereby pushes these swing pieces 191 downward. Then, slide magazine 90 further moves toward smear pickup position P, and long frame 90c1 at the rear side of base 90c passes through inclination surfaces 191b of swing pieces 191, so that the contact state between long frame 90c1 and inclination surfaces 191b ends. As a result, swing pieces 191 return to the original position, that is, to the state where tip end portions 191a are directed upward, by the action of the spring. In this manner, swing pieces 191 swing up and down twice every time one slide magazine 90 passes through these swing pieces 191. Whether swing pieces 191 are in the state of being pushed downward or in the state where tip end portions 191a thereof are directed upward can be detected with, for example, an optical sensor, a microswitch, or the like.

Figure 8:
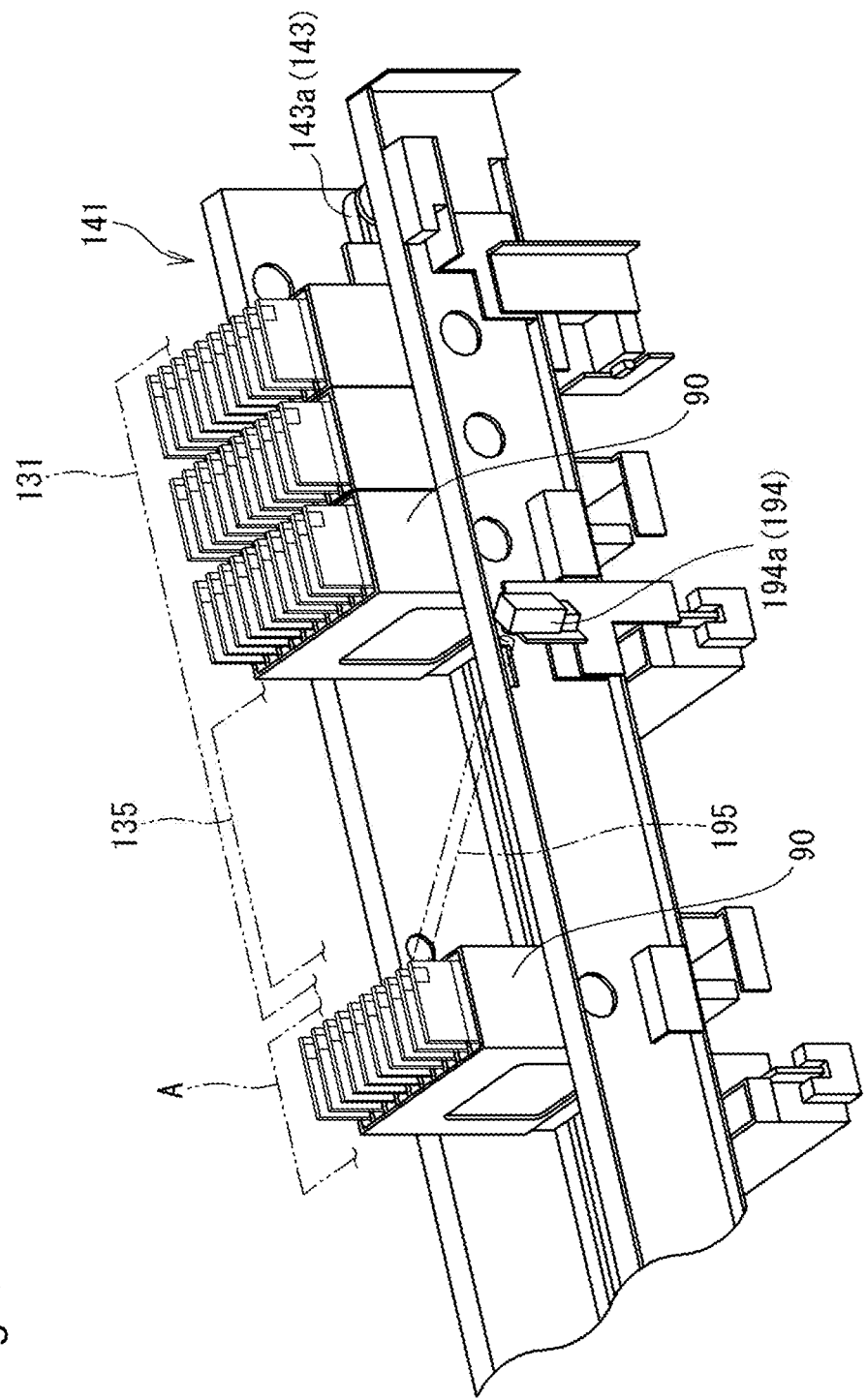
FIG. 8 is an explanatory perspective view of the first transport unit including an interrupting-smear-container set region.

The operation of stopping slide magazine 90 by stopper 193 can be done as follows, for example. Controller 110 of smear transporting apparatus 100 can control such a stop operation. (1) Controller 110 determines whether or not swing pieces 191 once pushed downward is at the original position, that is, in the state where tip end portions 191a are directed upward (hereinafter, such a state is referred to as "neutral state"), by the action of the spring. In this neutral state, tip end portions 191a of swing pieces 191 are located in recess 90e of base 90c of slide magazine 90. If it is determined that swing pieces 191 are in the neutral state, controller 110 determines whether or not slide magazines 90 are positioned at smear pickup position P and interrupting-smear-container set region 135. At smear pickup position P also, the same sensor is provided as detector 190 having swing pieces 191 described above. A signal from such a sensor enables controller 110 to determine whether swing pieces 191 at smear pickup position P is in the neutral state or not. Until the sorting of smear slides 11 accommodated in slide magazine 90 is completed, this slide magazine 90 is stopped at smear pickup position P. On the other hand, optical sensor 194 is provided in interrupting-smear-container set region 135 as illustrated in FIG. 8. Light receptor 194a receives light beam 195 emitted from an unillustrated light emitter. Such light receptor 194a and light emitter constitute optical sensor 194. When slide magazine 90 accommodating smear slide 11 manually prepared by the user is disposed in interrupting-smear-container set region 135, slide magazine 90 blocks light beam 195 from the light emitter to light receptor 194a. This enables the detection that slide magazine 90 is present in interrupting-smear-container set region 135.

(2) If controller 110 determined that slide magazine 90 is positioned at any one of smear pickup position P and interrupting-smear-container set region 135, an unillustrated drive mechanism slides stopper 193 in the width direction of the pair of belts 143, that is, the Y direction (see FIG. 1). Sliding stopper 193 in this manner shifts the position of this stopper 193 from notch 90d of base 90c of slide magazine 90 in the width direction (Y direction). Hence, even if belts 143 are driven, edge surface 193c1a of notch 193c of stopper 193 touches long frame 90c1 at the rear side of slide magazine 90, so that stopper 193 stops the movement of slide magazine 90 in the transport direction.

The same mechanism as stopper 193 in magazine buffer region 131 is also provided at each of smear pickup position P and smear storage position A. Thus, when slide magazine 90 is supplied from smear preparing apparatus 10 to magazine buffer region 131, even if belts 143 are driven to transport slide magazine 90 toward smear pickup position P, belts 143 transport only slide magazine 90 positioned in magazine buffer region 131, while the stopper at smear pickup position P stops slide magazine 90 positioned thereat until the sorting of smear slides 11 accommodated in slide magazine 90 at smear pickup position P is completed. In other words, since this embodiment adopts the stopper described above, it is possible to transport only necessary slide magazine 90. Slide magazine 90 unnecessary to be transported keeps sliding on driving belts 143 while prohibited from moving by stopper 193.

Figure 9:
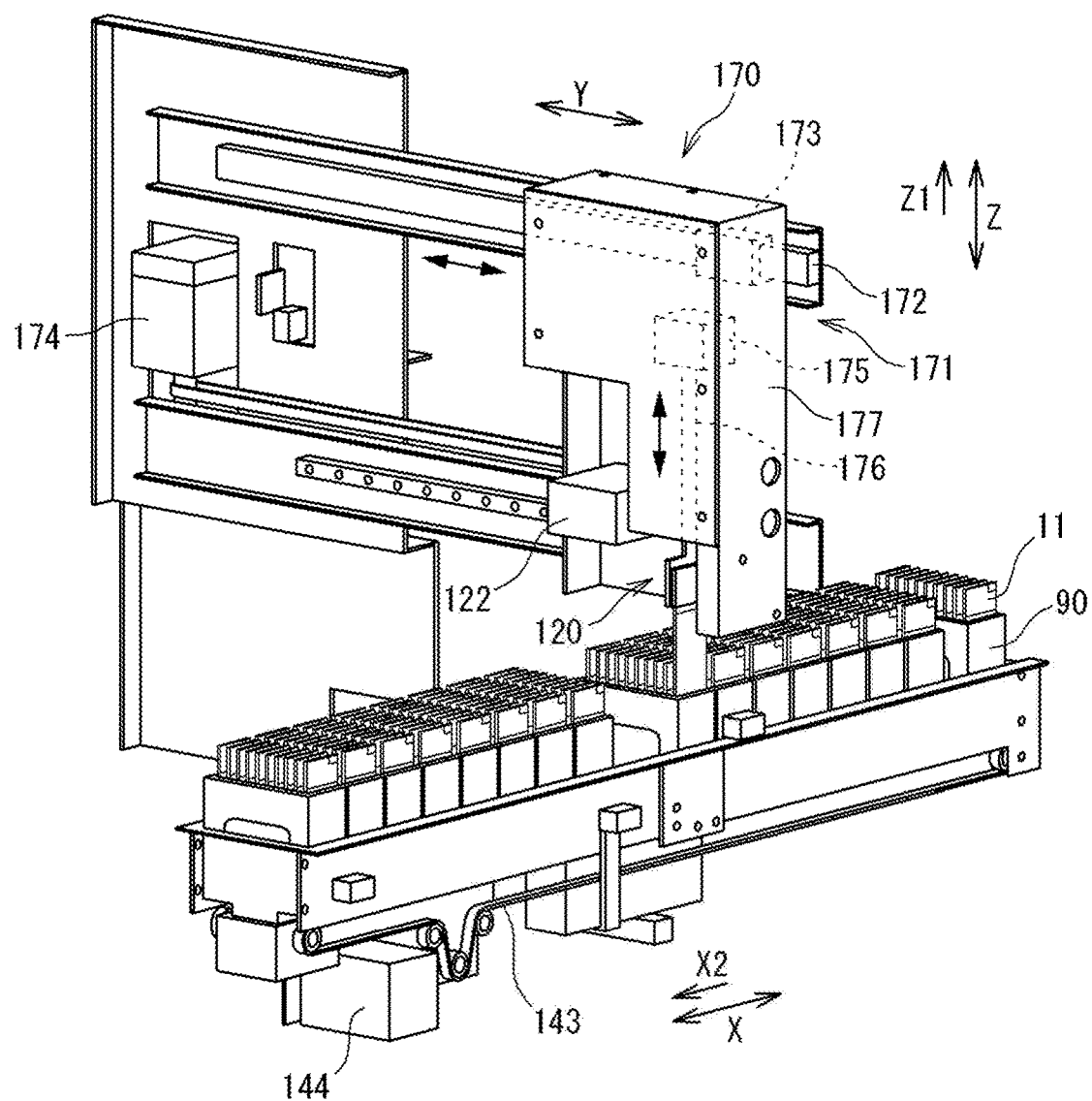
FIG. 9 is an explanatory perspective view of a smear transfer part

As illustrated in FIG. 9, smear transfer part 170 is provided above (Z1 direction) first transport unit 141 and second transport unit 142. Like transfer unit 30 in smear preparing apparatus 10 described above, smear transfer part 170 is provided to grip and transfer smear slide 11. Smear transfer part 170 is capable of putting each smear slide 11 one by one in and out slide magazine 90. As the configuration of smear transfer part 170 for putting each smear slide 11 in and out one by one in this manner, various configurations can be adopted. In this embodiment, as illustrated in FIG. 9, a 2-axis coordinate robot is adopted which is movable in the horizontal direction (Y direction) and in the top-bottom direction (Z direction) or vertical direction, and includes handling member 120 for gripping smear slide 11. As handling member 120, it is possible to use, for example, an open-close mechanism capable of grasping smear slide 11 from both sides, or an aspiration mechanism which grasps smear slide 11 by suction on a predetermined spot thereof at a negative pressure.

Smear transfer part 170 is movable in the horizontal direction (Y direction) by movement mechanism 171. Movement mechanism 171 includes Y-axis rail 172, Y-axis slider 173 which engages with this Y-axis rail 172, and Y-axis motor 174. As Y-axis motor 174, for example, stepping motors and servomotors can be adopted. Y-axis motor 174 moves Y-axis slider 173 in the Y direction with a transmission mechanism including a belt-pulley mechanism.

Smear transfer part 170 includes Z-axis motor 175 and transmission mechanism 176 for elevating and lowering handling member 120. Z-axis motor 175 is capable of elevating and lowering handling member 120 with transmission mechanism 176.

Figure 10:
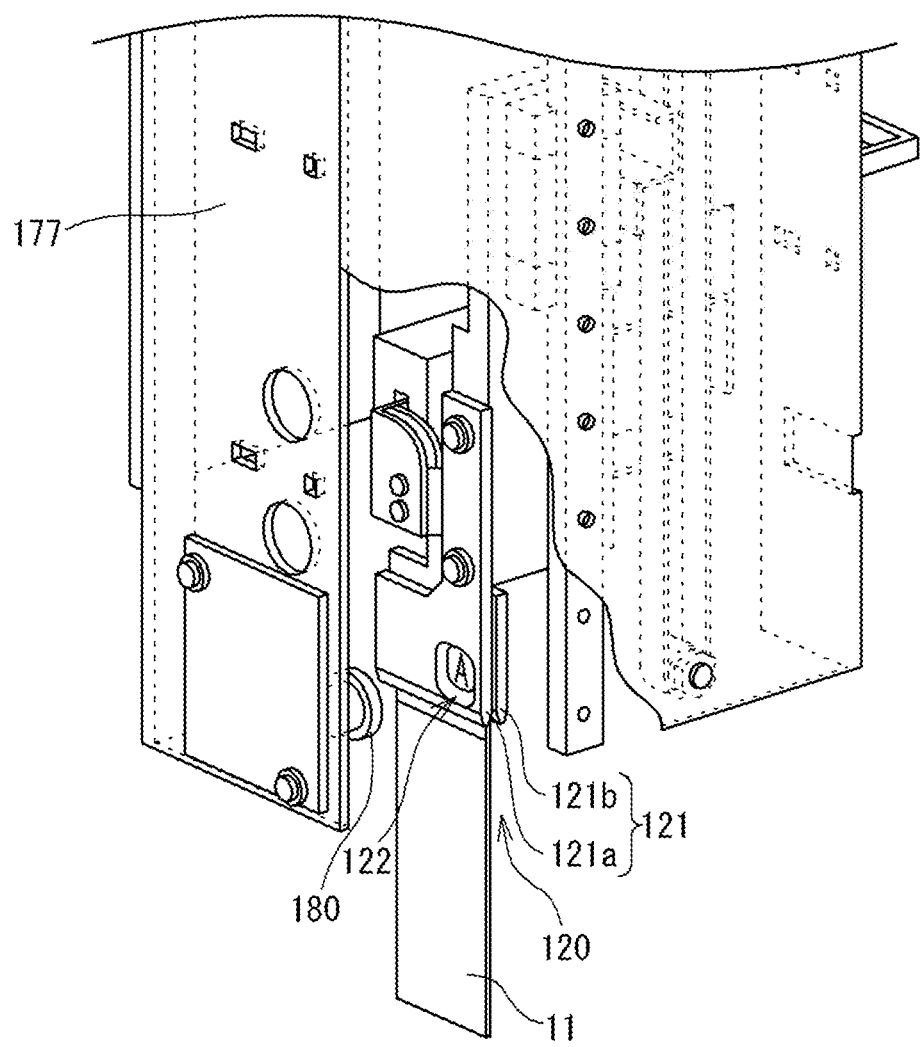
FIG. 10 is an explanatory perspective view of principal components of the smear transfer part illustrated in FIG. 9.

As illustrated in FIG. 10, handling member 120 includes a pair of gripping plates 121a, 121b. Handling member 120 is capable of gripping one smear slide 11 in the thickness direction from both sides with the pair of gripping plates 121a, 121b. The pair of gripping plates 121a, 121b grip smear slide 11 by respectively coming into contact with the front surface and the back surface of smear slide 11. Of the pair of gripping plates 121a, 121b, gripping plate 121b at the back surface side is capable of moving smear slide 11 in the thickness direction. Gripping plate 121b can be moved by motor 122. Note that, other than the motor, an actuator, for example, an air cylinder, a solenoid, or the like can also be used.

An opening 122 is formed in gripping plate 121a of the pair of gripping plates 121a, 121b which is at the front surface side (side where frost section 12 is provided) of smear slide 11. The position and shape of opening 122 formed are selected so that a camera to be described later can capture an image of image-capturing necessity identification information typed on frost section 12 of smear slide 11 gripped by the pair of gripping plates 121a, 121b. In this embodiment, substantially rectangular opening 122 is formed in gripping plate 121a at the front surface side of smear slide 11. The pair of gripping plates 121a, 121b grip a portion of frost section 12 of smear slide 11 excluding where image-capturing necessity identification information is typed.

Smear transporting apparatus 100 according to this embodiment further includes the identification-information acquisition part for acquiring identification information provided to smear slide 11 taken out by smear transfer part 170. As illustrated in FIG. 10, an inner surface of casing 177 accommodating mechanisms such as Z-axis motor 175 of smear transfer part 170 is provided with image capture part 180 which is the identification-information acquisition part. This image capture part 180 is provided at a position facing an identifier for whether image capturing is necessary or not of smear slide 11 taken up by handling member 120 of smear transfer part 170. As image capture part 180, for example, a camera can be used. As the identification-information acquisition part, a barcode reader may be used instead of image capture part 180.

Image capture part 180 is capable of capturing an image of image-capturing necessity identification information, which is exposed to the outside from opening 122 formed in gripping plate 121a at the front surface side of smear slide 11. In this embodiment, as the image-capturing necessity identification information, alphabet "A" is typed on frost section 12. This image-capturing necessity identification information "A" is exposed to the outside from opening 122. The captured image data is transmitted to controller 110 of smear transporting apparatus 100. On the basis of the transmitted image data, captured-image determination part 112 of controller 110 determines whether or not smear slide 11 taken up by handling member 120 is one whose image is to be captured by smear-image capture apparatus 200.

Figure 11:
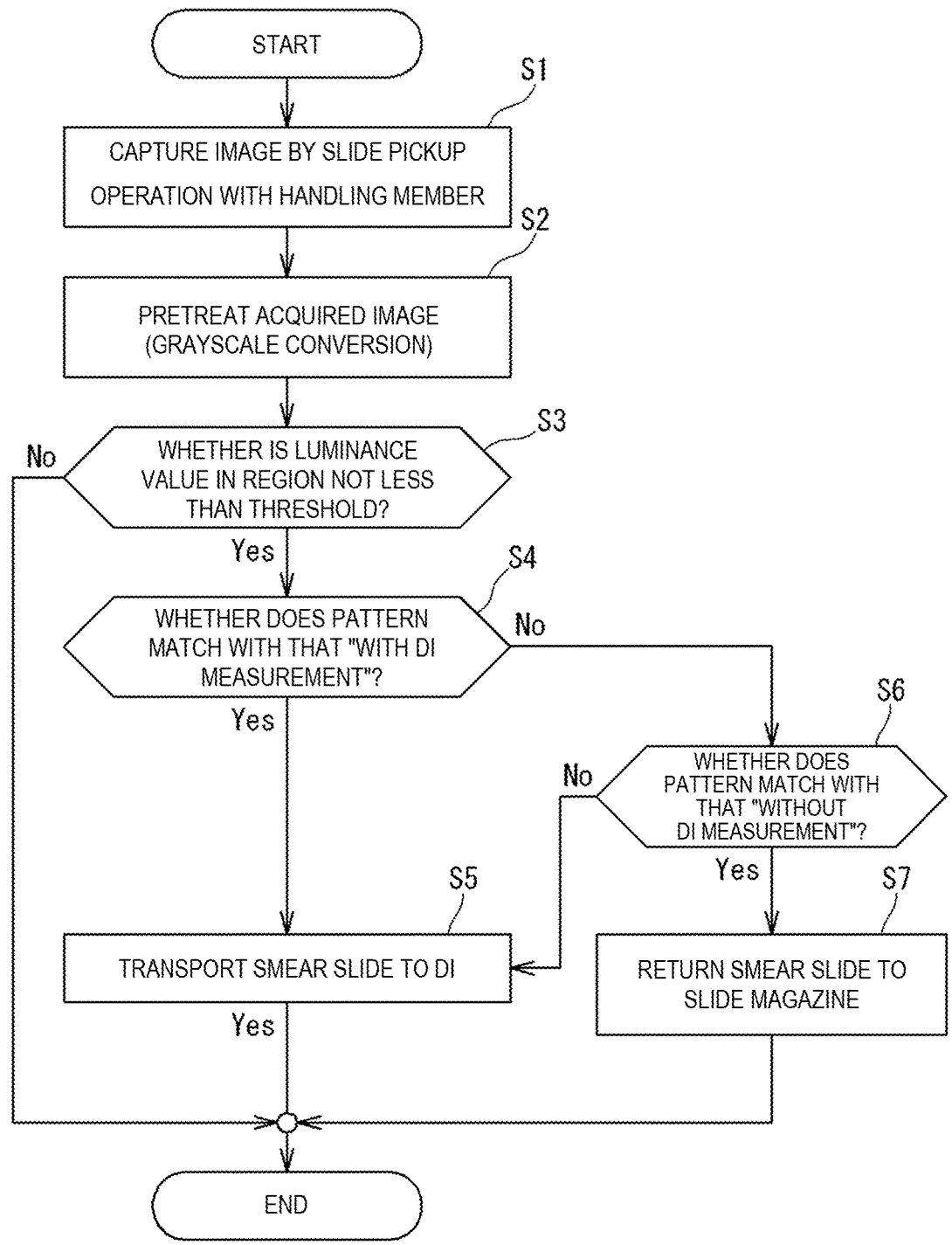
FIG. 11 is a flowchart for illustrating a procedure of determining whether a smear slide is one whose image is to be captured or not.

FIG. 11 is a flowchart for illustrating a procedure of determining whether smear slide 11 is one whose image is to be captured or not. First, in step S1, an image of frost section 12 of smear slide 11 taken up by handling member 120 from slide magazine 90 at smear pickup position P is captured. Image capture part 180 obtains such an image of smear slide 11 by capturing an image of frost section 12 exposed to the outside from opening 122 formed in gripping plate 121a at the front surface side of smear slide 11. The captured image is transmitted to controller 110 of smear transporting apparatus 100.

Subsequently, in step S2, controller 110 performs a grayscale conversion as a pretreatment on the acquired image. In this embodiment, it is determined not only whether image capturing by smear-image capture apparatus (DI) 200 is necessary or not, but also whether handling member 120 grips smear slide 11 or not. In a case where hand member 31 of smear preparing apparatus 10 fails to grip smear slide 11 or similar cases, it is conceivable that there is a space where no smear slide 11 is stored in a section of slide magazine 90. Moreover, in a case where an urgent visual test is necessary, it is conceivable that when the user pulls up smear slide 11 in the middle of the test, there is a similar space where no smear slide 11 is stored in a section of slide magazine 90.

Subsequently, in step S3, controller 110 determines whether or not a luminance value of a region in frost section 12 exposed to the outside through opening 122 is not less than a threshold saved in advance. Of the pair of gripping plates 121, gripping plate 121b at the back surface side of smear slide 11 has a surface which faces a surface of gripping plate 121a at the front surface side of smear slide 11, and which is colored with a color, for example, black, having a luminance value lower than a luminance value frost section 12 can take. The color may be dark brown or other colors than black. Hence, if image capture part 180 captures an image of a portion exposed from opening 122 with no smear slide 11 gripped by the pair of gripping plates 121, the obtained image has such a low luminance value. When image-capturing necessity identification information is typed on frost section 12 of smear slide 11, the portion of frost section 12 exposed to the outside through opening 122 where the image-capturing necessity identification information is typed is brighter than black. Thus, setting the threshold at a larger luminance value than the aforementioned low value and comparing this threshold with a luminance value to be obtained make it possible to determine whether smear slide 11 is present or absent. In step S3, if it is determined that the obtained luminance value is not less than the threshold, controller 110 advances the processing to step S4. On the other hand, if it is determined that the obtained luminance value is less than the threshold, controller 110 completes the determination procedure. In step S3, image processing is performed by utilizing the luminance value indicating the magnitude of brightness of the acquired mage. In step S3, if it is determined that no smear slide 11 is gripped, smear transfer part 170 can check the position using, for example, a rotary encoder, and prepare transferring of the next smear slide 11 without returning to the original position of this smear transfer part 170.

In step S4, controller 110 performs pattern processing on the acquired image, and determines whether or not the pattern of this image matches with an image capturing pattern of smear-image capture apparatus (DI) saved in advance. If it is determined that the pattern of the acquired image matches with the image capturing pattern of the smear-image capture apparatus, controller 110 advances the processing to step S5, and transports smear slide 11 gripped by handling member 120 to smear-image capture apparatus 200. On the other hand, if it is determined that the pattern of the acquired image does not match with the image capturing pattern of the smear-image capture apparatus, controller 110 advances the processing to step S6.

In step S6, controller 110 determines whether or not the pattern of the acquired image matches with a non-image capturing pattern of the smear-image capture apparatus saved in advance. If it is determined that the pattern of the acquired image matches with the non-image capturing pattern of the smear-image capture apparatus, controller 110 advances the processing to step S7, and returns smear slide 11 gripped by handling member 120 to the original position in slide magazine 90. On the other hand, if it is determined that the pattern of the acquired image does not match with the non-image capturing pattern of the smear-image capture apparatus, controller 110 advances the processing to step S5, and transports smear slide 11 gripped by handling member 120 to smear-image capture apparatus 200. In this embodiment, since smear slide 11 manually prepared by the user is also desirably subjected to the processing by smear-image capture apparatus 200, if whether image-capturing necessity identification information is either information indicating that image capturing is necessary or information indicating that image capturing is unnecessary is unknown, smear-image capture apparatus 200 ought to capture an image. This is because when the user manually prepares smear slide 11, frost section 12 may not be typed, or patient information may be written with a pencil or the like. As described above, since smear slide 11 whose pattern does not match with the non-image capturing pattern is transported to smear-image capture apparatus 200, the processing in step S4 may be omitted.

When it is determined that smear slide 11 is one whose image is to be captured by smear-image capture apparatus 200, smear transfer part 170 transfers the smear slide to smear delivery position W to be described later, and horizontal movement mechanism 123 constituting this smear transfer part 170 transports the smear slide to smear-image capture apparatus 200.

As illustrated in FIG. 1, horizontal movement mechanism 123 is a mechanism for moving smear slide 11 in the right-left direction between smear delivery position W and smear receiver 205 of smear-image capture apparatus 200. Horizontal movement mechanism 123 includes transport unit 150 which receives smear slide 11 from smear transfer part 170 at smear delivery position W, moves in the left direction toward smear receiver 205 of smear-image capture apparatus 200, receives smear slide 11 whose image has been captured from smear receiver 205, and moves in the right direction toward smear delivery position W.

Figure 12:
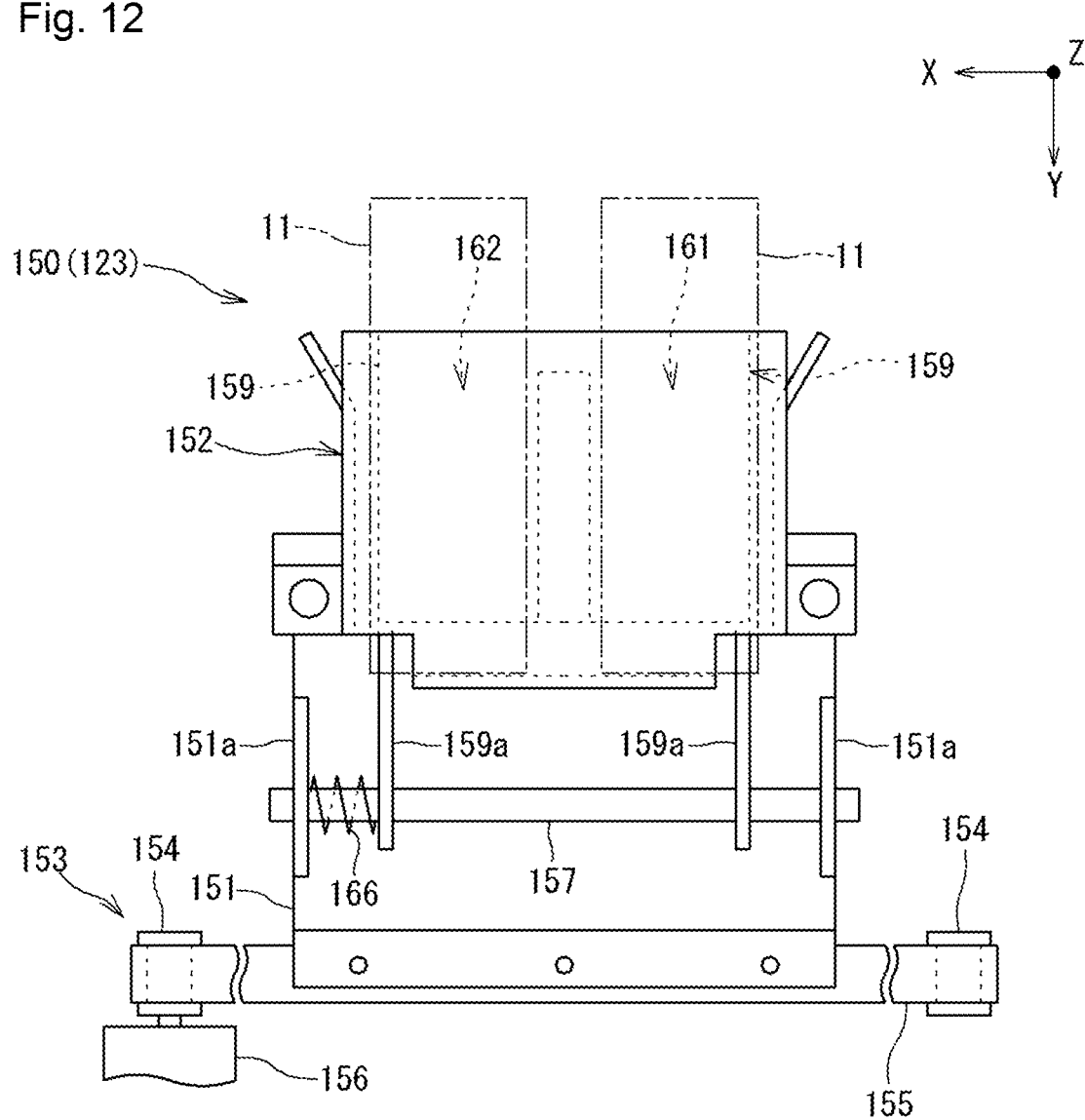
FIG. 12 is a plan explanatory diagram of a horizontal movement mechanism.

As illustrated in FIG. 12, transport unit 150 includes base 151, transport case 152, and traverse movement part 153. An apparatus frame (unillustrated) of smear transporting apparatus 100 supports base 151 movably in the right-left direction between smear delivery position W illustrated in FIG. 1 and smear receiver 205 of smear-image capture apparatus 200. Traverse movement part 153 includes a belt conveyor including belt 155 wound around a pair of right and left pulleys 154, drive motor 156 which drives one of pulleys 154, and so forth. Moreover, in an upper portion of base 151, a pair of right and left support pieces 151*a* are provided. Support shaft 157 having an axis in the right-left direction is bridged between these support pieces 151*a*.

Transport case 152 functions as a container formed in accordance with the shape of smear slides 11 in such a manner as to accommodate these smear slides 11. Transport case 152 includes first smear accommodation section 161 which accommodates smear slide 11 whose image has yet to be captured, and second smear accommodation section 162 which accommodates smear slide 11 whose image has been captured. Right and left wall members 159 of transport case 152 are respectively provided with link arms 159*a* extending frontward. Tip end portions of link arms 159*a* are rotatably linked to support shaft 157. Thus, transport case 152 is swingable up and down (back and forth) around support shaft 157. This swinging can change the posture between a horizontal posture (reference posture) in which openings of first, second smear accommodation sections 161, 162 are directed rearward and a standing posture in which the openings are directed upward. In other words, transport case 152 is capable of changing the posture between a state where the smeared surface of smear slide 11 is directed in a substantially perpendicular direction (horizontal posture in which smear slide 11 is substantially horizontal) and a state where the smeared surface is directed in the horizontal direction (one direction intersecting with the perpendicular direction) (standing posture).

As illustrated in FIGS. 13A to 14B, posture change mechanism 165 changes the posture of transport case 152 of transport unit 150. This posture change mechanism 165 includes operation bar 165*a* inserted below transport case 152 of transport unit 150 positioned at smear delivery position W, and driver 165*b* as a rotation mechanism which moves or rotates this operation bar 165*a* up and down. Driver 165*b* can be constituted of a drive motor, a link member, and so forth. Moreover, when driver 165*b* moves operation bar 165*a*, transport case 152 swings or rotates up and down around support shaft 157, and is in any one posture of horizontal posture and standing posture described above. Note that, to support shaft 157, bias member 166 including a torsion coil spring (see FIG. 12) is attached. This bias member 166 biases transport case 152 in a direction in which the transport case swings downward (direction to be in the horizontal posture).

Smear slide 11 pulled up from slide magazine 90 by handling member 120 of smear transfer part 170 is inserted into first smear accommodation section 161 of transport case 152 of transport unit 150 at smear delivery position W by lowering handling member 120. In this event, posture change mechanism 165 makes transport case 152 in the standing posture while the openings of first smear accommodation section 161 and of second smear accommodation section 162 are directed upward.

Figure 13A:
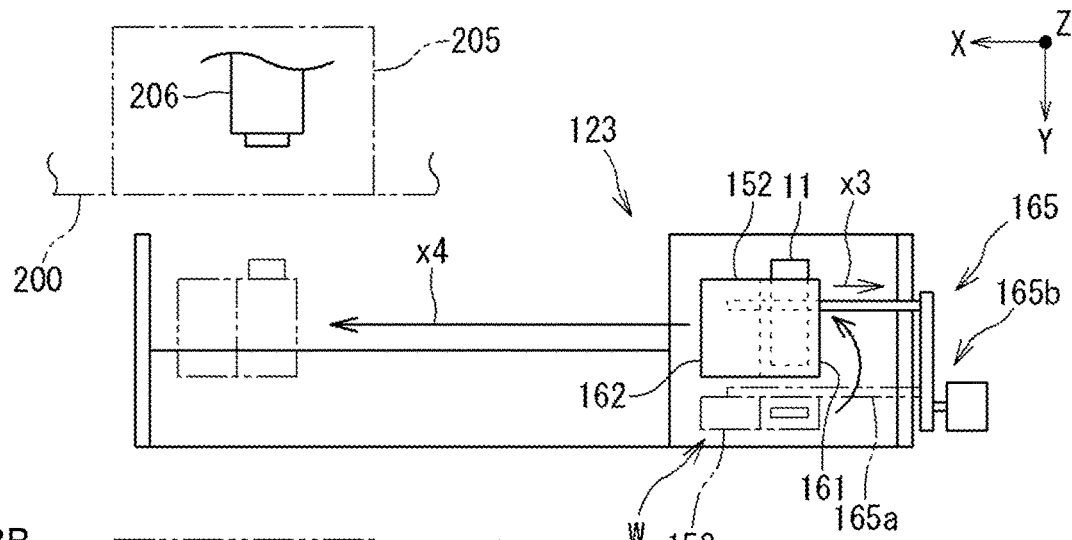
FIGS. 13A to 13C are diagrams for explaining operations of the horizontal movement mechanism.
Figure 13B:
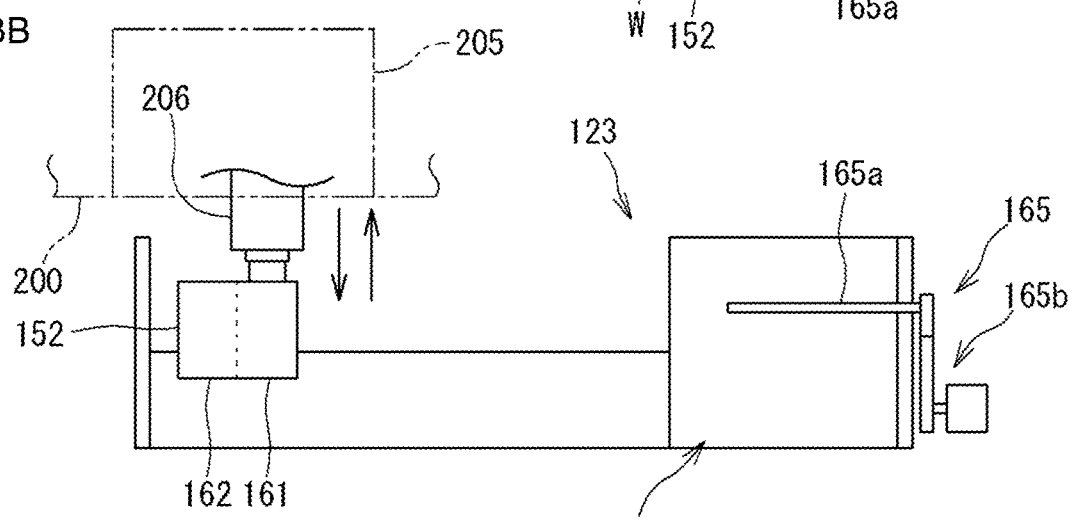
Figure 13C:
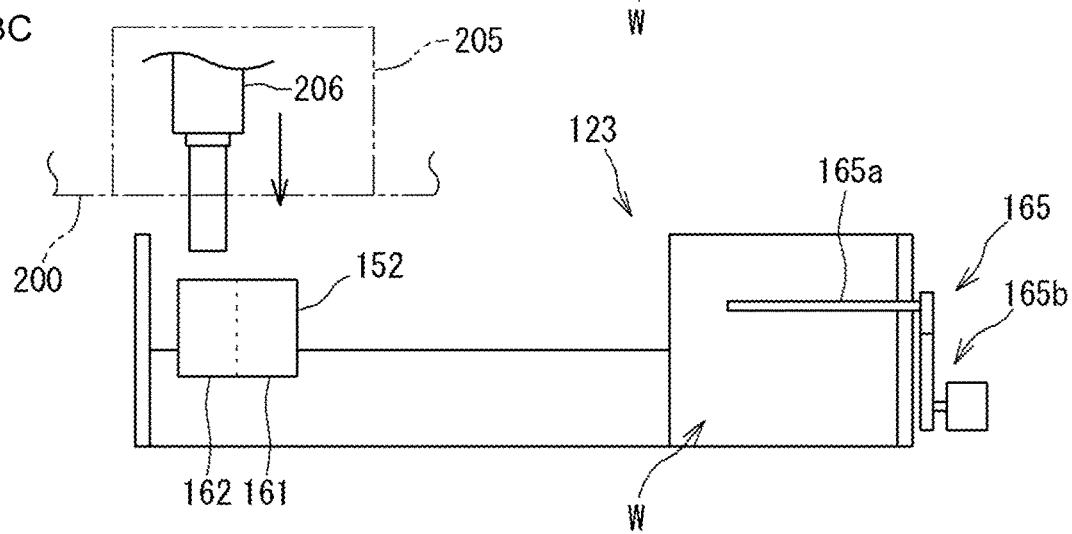
Figure 14A:
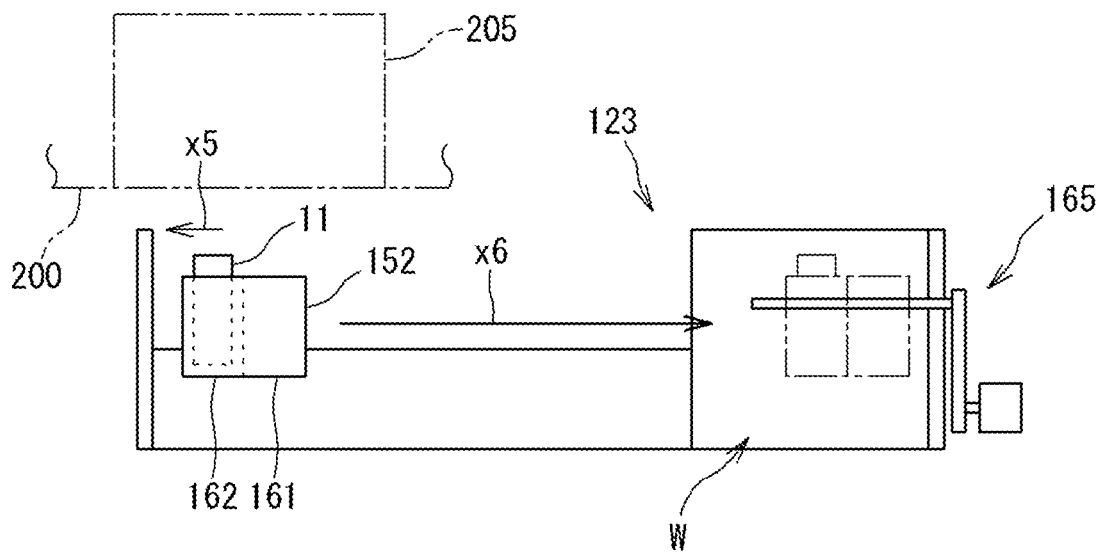
FIGS. 14A and 14B are diagrams for explaining operations of the horizontal movement mechanism.
Figure 14B:
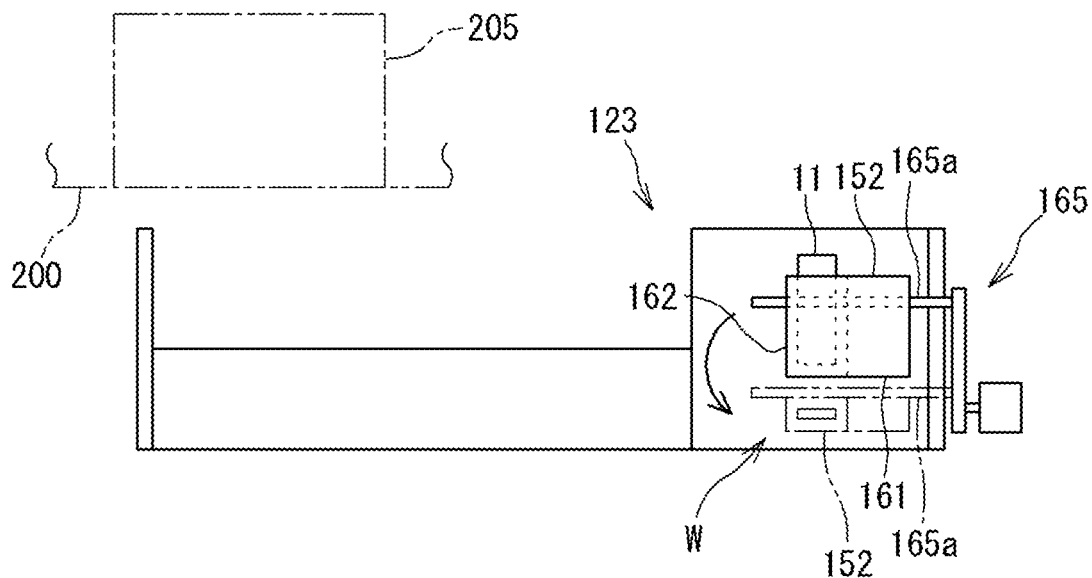
Figure 15:
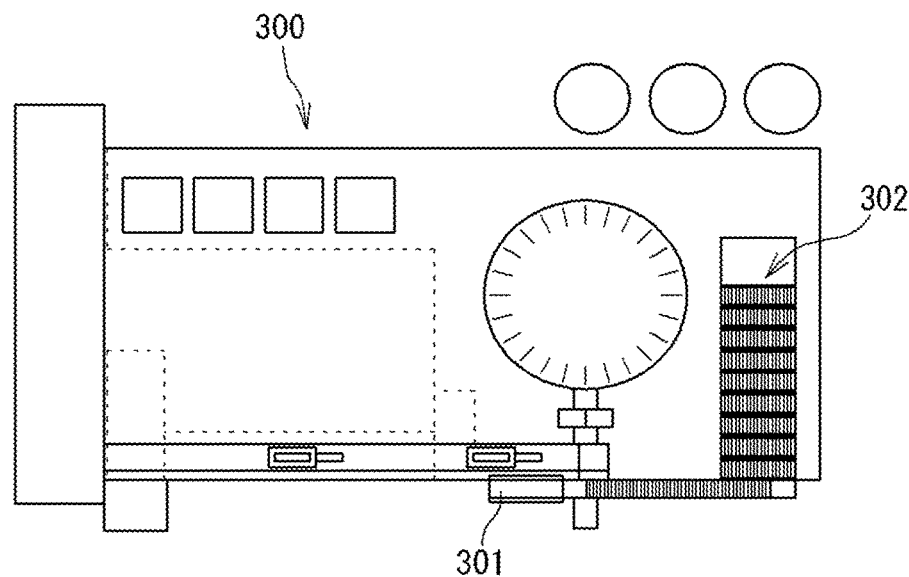
FIG. 15 is a plan explanatory diagram of a conventional smear preparing apparatus.

As illustrated in FIGS. 13A to 13C, when smear slide 11 is inserted in transport case 152 of transport unit 150 at smear delivery position W and posture change mechanism 165 changes the posture of transport case 152 to the horizontal posture, traverse movement part 153 (see FIG. 12) is activated to move transport case 152 accommodating smear slide 11 in the left direction (arrow x4). Thereby, transport case 152 is positioned at smear receiver 205 of smear-image capture apparatus 200 (see FIG. 13A).

Smear-image capture apparatus 200 includes transport unit 206 for moving smear slide 11. This transport unit 206 takes out smear slide 11 from transport case 152 moved to smear receiver 205 (see FIG. 13B). Transport unit 206 transports smear slide 11 thus taken out to oil applier 207. This oil applier 207 applies as necessary an oil to a sample such as blood smeared on this smear slide 11. Then, transport unit 206 transports smear slide 11 to image capture part 201 (see FIG. 1). This image capture part 201 captures an image of the sample. The captured image data is transmitted to controller 202. Controller 202 performs predetermined processings such as cell-characteristic extraction processing, identification classification processing, blood-cell image trimming, blood-cell automatic classification, and counting each blood cell type. The captured image data and the analysis result can be displayed on display monitor 203, or can be outputted with an unillustrated printer or the like. Controller 202 is connected to controller 110 of smear transporting apparatus 100 with communicators 204, 111, and information exchange is possible for operations in collaboration with each other.

Transport unit 206 returns smear slide 11 whose image has been captured (tested) to smear receiver 205, which then returns the smear slide to awaiting transport case 152. In this event, smear slide 11 whose image has been captured is inserted in second smear accommodation section 162 of transport case 152 (see FIG. 13C). Subsequently, transport case 152 is transported in the right direction (arrow x6) (see FIG. 14A) and positioned at smear delivery position W again. Thereafter, posture change mechanism 165 changes the posture of transport case 152 of transport unit 150 from the horizontal posture to the standing posture (see FIG. 14B).

Handling member 120 of smear transfer part 170 takes up smear slide 11 in second smear accommodation section 162 of transport case 152 in the standing posture at smear delivery position W, and stores the smear slide in slide magazine 90 awaiting at smear storage position A.

Note that, in the operation example of transport case 152 explained using FIGS. 13A to 14B, transport case 152 moved to smear receiver 205 of smear-image capture apparatus 200 awaits at the position after delivering smear slide 11 to transport unit 206 until transport unit 206 transports smear slide 11 whose image has been captured (see FIGS. 13B and 13C). The image capturing of smear slide 11 by smear-image capture apparatus 200 and the analysis normally need approximately 2 minutes. Hence, when smear slide 11 is delivered to transport unit 206, immediately thereafter making transport case 152 return to smear delivery position W, receive smear slide 11 to be analyzed the next at this smear delivery position W, and return transport case 152 to smear receiver 205 can shorten the waiting time and enhance the analysis efficiency. In this case, first, transport unit 206 accommodates smear slide 11 whose image has been captured in second smear accommodation section 162 of transport case 152 waiting at smear delivery position W. Subsequently, transport unit 206 takes out smear slide 11 to be analyzed the next in first smear accommodation section 161 of transport case 152.

[Other Modification Examples]

The invention is not limited to the above-described embodiments, and various modifications are possible within the scope of the claims.

For example, in the above-described embodiment, the captured-image determination part of the smear transporting apparatus determines whether or not a smear slide is one whose image is to be captured by the smear-image capture apparatus. Nonetheless, it is also possible to make the host computer determine whether or not a smear slide is one whose image is to be captured by the smear-image capture apparatus by transmitting image data captured by the image capture part of the smear transporting apparatus to this host computer.

Moreover, in the above-described embodiment, if it is determined that a smear slide taken up by the handling member from a slide magazine is one whose image is not to be captured, the smear slide is returned to the original slide magazine. Nonetheless, such a smear slide can be accommodated in another slide magazine different from the original slide magazine. This another slide magazine may be disposed in the first magazine storage region from the beginning, or may be moved to the first magazine storage region after a predetermined number of smear slides are determined to be ones whose images are not to be captured and accommodated together.

Further, in the above-described embodiment, the printer of the smear preparing apparatus types or prints identification information on a smear slide. Nonetheless, the invention is not limited thereto. Identification information may be provided to a smear slide in other ways. For example, the color of a smear slide whose image is to be captured can be changed from the color of a non-image-capturing-target smear slide whose image is not to be captured. In this case, the color itself constitutes identification information. Alternatively, instead of using the printer of the smear preparing apparatus, a smear slide printed in advance with identification information on whether image capturing is necessary or not can be used. Furthermore, in a case other than typing on a smear slide, a seal or the like on which identification information is typed can also be pasted to a smear slide.

Note that controllers 80, 110, 202, and the like may be implemented such that, for example, a circuitry such as one or more central processing units (CPUs) or processors executes a predetermined program(s).

One or more embodiments may be specified in the following paragraphs.

A smear system comprises a smear preparing apparatus which prepares a smear slide on which a sample is smeared, and a smear transporting apparatus which transports the smear slide prepared by the smear preparing apparatus to a smear-image capture apparatus. The smear preparing apparatus comprises a smear preparation part which prepares a smear slide by smearing a sample on a slide, and a smear arrangement part which places, in a smear container, smear slides including a smear slide whose image is to be captured by the smear-image capture apparatus and a smear slide whose image is not to be captured by the smear-image capture apparatus. The smear transporting apparatus comprises a smear-container transport part which transports the smear container with the smear slides placed by the smear arrangement part, an identification-information acquisition part which acquires identification information on whether image capturing by the smear-image capture apparatus is necessary or not, from each of the smear slides accommodated in the smear container positioned on a transport path of the smear-container transport part, and a smear transfer part which transfers the smear slide whose image is to be captured to the smear-image capture apparatus on the basis of the identification information acquired by the identification-information acquisition part.

The smear preparing apparatus prepares a smear slide whose image is to be captured by the smear-image capture apparatus and a smear slide whose image is not to be captured. Even in the case where the smear transporting apparatus transports the smear container containing a mixture of these smear slides, the smear slide whose image is to be captured is automatically identified on the transport path of the smear transporting apparatus, making it possible to transfer only the smear slide whose image is to be captured to the smear-image capture apparatus. This enables efficient image capturing of the smear slide whose image is to be captured and which is accommodated in the smear container.

The smear preparing apparatus may further comprise an identification-information providing part which provides the identification information on the slide.

The identification-information acquisition part may comprise an image capture part which captures an image of a smear slide, and the smear transfer part transfers a smear slide to the smear-image capture apparatus if the image of the smear slide captured by the image capture part includes identification information indicating that the image capturing by the smear-image capture apparatus is necessary. In this case, it is possible to more accurately identify the smear slide whose image is to be captured. In addition, for example, when the user manually prepares a smear slide from a sample whose image needs to be captured urgently and puts the smear slide in the smear arrangement part, if the user provides identification information indicating that the image capturing is necessary to the slide by hand writing or the like, it can be determined that the smear slide is one whose image is to be captured on the basis of the image of the smear slide, and the smear slide is transferred to the smear-image capture apparatus.

The identification-information acquisition part may comprise an image capture part which captures an image of a smear slide, and the smear transfer part transfers a smear slide to the smear-image capture apparatus if the image of the smear slide captured by the image capture part does not include identification information indicating that the image capturing by the smear-image capture apparatus is unnecessary. In this case, since a smear slide whose image is to be captured can be determined in accordance with the presence or absence of the identification information indicating that the image capturing is unnecessary, the process can be simplified. Moreover, for example, when the user manually prepares a smear slide from a sample whose image needs to be captured urgently and puts the smear slide in the smear arrangement part, even if the user does not provide the identification information indicating that the image capturing is necessary, it can be determined that the smear slide is one whose image is to be captured on the basis of the image of the smear slide, and the smear slide is transferred to the smear-image capture apparatus.

The identification information may include sample identification information for identifying a sample, the smear system may further comprise a communicator which inquires of an external computer whether the image capturing by the smear-image capture apparatus is necessary or not on the basis of the sample identification information acquired by the identification-information acquisition part, and the smear transfer part transfers the smear slide to the smear-image capture apparatus if the communicator receives, from the external computer, a result indicating that the image capturing by the smear-image capture apparatus is necessary.

The identification-information acquisition part may acquire the identification information while the smear transfer part is holding the smear slide after taking out the smear slide from the smear container. In this case, since the identification information is acquired while the smear transfer part is holding the smear slide after taking out the smear slide from the smear container, even if the identification information provided to the smear slide is hidden in the smear arrangement part, it is possible to acquire the identification information more reliably. In a case where this smear slide is one whose image is to be captured by the smear-image capture apparatus, efficient transferring of this smear slide to the smear-image capture apparatus is possible.

The identification information may be provided to a portion of a frost section of the smear slide, and the smear transfer part holds the frost section excluding the portion, enabling the identification-information acquisition part to acquire the identification information. In this case, since the smear transfer part holds a portion of the frost section where the identification information is not provided, it is possible to acquire the identification information more reliably.

The smear transfer part may transfer the smear slide whose image is to be captured from a position where the identification information is acquired to the smear-image capture apparatus, but return the smear slide whose image is not to be captured from the position where the identification information is acquired to an original position in the smear container where the smear slide has been accommodated.

The smear system may further comprise a determination part which determines whether an image of a smear slide is to be captured by the smear-image capture apparatus or not on the basis of the identification information. The determination part may further determine whether the smear transfer part is holding the smear slide or not on the basis of the image obtained by the image capture part.

The smear transfer part may comprise a pair of gripping plates capable of gripping a smear slide, and an opening is formed in one of the paired gripping plates which is in contact with a surface of the smear slide where a frost section is provided, such that a portion of the frost section provided with the identification information is exposed to the outside from the opening. In this case, capturing an image of the identification information exposed from the opening of the gripping plate gripping the smear slide makes it possible to determine whether the smear slide is one whose image is to be captured or not.

A surface of one of the paired gripping plates which is in contact with a back surface side of the smear slide may be colored such that a luminance value thereof is less than a luminance value of the frost section.

On the transport path where a smear container received from the smear preparing apparatus is transported to the position where the identification-information acquisition part acquires identification information, the smear-container transport part may allow a user to access the smear container. In this case, since it is determined whether a smear slide is transferred to the smear-image capture apparatus or not on the basis of the identification information acquired from the smear slide, appropriate measures are possible even when the user switches smear containers on the transport path, a manually-prepared smear slide is added into a smear container, or the positions (order) of smear slides in a smear container are changed.

The smear-container transport part may allow a smear container accommodating a manually-prepared smear slide to be set on the transport path.

The smear transfer part may take out the smear slide whose image is to be captured from the smear container, put the smear slide in a transport case, and transfer the smear slide to the smear-image capture apparatus.

A smear transporting apparatus transports a smear slide on which a sample is smeared to a smear-image capture apparatus. The smear transporting apparatus comprises: a smear-container transport part which transports a smear container accommodating smear slides; an identification-information acquisition part which acquires identification information on whether image capturing by the smear-image capture apparatus is necessary or not, from each of the smear slides accommodated in the smear container positioned on a transport path where the smear-container transport part transports the smear container; and a smear transfer part which transfers the smear slide whose image is to be captured to the smear-image capture apparatus on the basis of the identification information acquired by the identification-information acquisition part.

Even in the case where the smear transporting apparatus transports a smear container containing a mixture of a smear slide whose image is to be captured and a smear slide whose image is not to be captured, the smear slide whose image is to be captured is automatically identified on the transport path of the smear transporting apparatus, making it possible to transfer only the smear slide whose image is to be captured to the smear-image capture apparatus. This enables efficient image capturing of the smear slide whose image is to be captured and which is accommodated in the smear container.

A smear preparing apparatus comprises: a smear preparation part which prepares a smear slide by smearing a sample on a slide; an identification-information providing part which provides, on a slide, image-capturing necessity identification information on whether image capturing by a smear-image capture apparatus is necessary or not; and a smear arrangement part which places, in a smear container, smear slides provided with the image-capturing necessity identification information.

Even in the case where a smear container contains a mixture of a smear slide whose image is to be captured by the smear-image capture apparatus and a smear slide whose image is not to be captured, the identification information on whether the image capturing is necessary or not provided to the slide makes it possible to easily identify the smear slide whose image is to be captured and the smear slide whose image is not to be captured. This enables efficient image capturing of the smear slide whose image is to be captured and which is accommodated in the smear container.

The smear transporting apparatus, the smear system, and the smear preparing apparatus according to the embodiments above can make it possible to efficiently capture images of smear slides whose images are to be captured and which are accommodated in a smear container.

What is claimed is:

1. A slide smear system comprising:
a smear preparing apparatus comprising a smearer that prepares a smear slide on which a sample is smeared by the smearer;
a smear container capable of holding a plurality of smear slides prepared and placed by the smear preparing apparatus; and
a smear transporting apparatus that transports the plurality of smear slides accommodated by the smear container to a smear-image capture apparatus, wherein
the smear transporting apparatus comprises:
a first controller programmed to control:
a smear-container transport part to transport the smear container accommodating at least one smear slide whose image is either to be captured or is not to be captured;
a smear transfer part provided above the smear-container transport part to pick the at least one smear slide; and
an identification-information acquisition part comprising an imaging device or a code reader to acquire identification information, from the at least one smear slide picked by the smear transfer part at an identification-information acquisition position, by which the first controller determines whether the image is to be captured or is not to be captured by the smear-image capture apparatus,
wherein the first controller is further programmed to control the smear transfer part to transfer the at least one picked smear slide directly from the identification-information acquisition position to the smear-image capture apparatus in response to the first controller determining that the image is to be captured for the at least one picked smear slide, and to transfer the at least one picked smear slide directly from the identification-information acquisition position to a location different from the smear-image capture apparatus in response to the first controller determining that the image is not be captured for the at least one picked smear slide.

2. The slide smear system according to claim 1, wherein the smear preparing apparatus comprises a second controller programmed to control an identification-information providing part, which comprises a printer, to provide the identification information on the plurality of slides.

3. The slide smear system according to claim 1, wherein the smear transfer part transfers the at least one picked smear slide to the smear-image capture apparatus if the image of the at least one picked smear slide captured by the identification-information acquisition part does not include identification information indicating whether the image is to be captured or is not to be captured by the smear-image capture apparatus.

4. The slide smear system according to claim 1, wherein the identification information includes sample identification information for identifying a sample,
the first controller is further programmed to inquire of an external computer whether the image is to be captured or is not to be captured by the smear-image capture apparatus on the basis of the sample identification information acquired by the identification-information acquisition part, and
the first controller is further programmed to, in response to receiving, from the external computer, a result indicating that the image is to be captured by the smear-image capture apparatus, control the smear transfer part to transfer the at least one picked smear slide whose image is to be captured to the smear-image capture apparatus.

5. The slide smear system according to claim 1, wherein the identification-information acquisition part acquires the identification information while the smear transfer part is holding the at least one picked smear slide after picking the smear slide from the smear container.

6. The slide smear system according to claim 5, wherein the identification information is provided to a portion of a frost section of the at least one picked smear slide, and
the smear transfer part holds the frost section excluding the portion so that the identification-information acquisition part can acquire the identification information.

7. The slide smear system according to claim 5, wherein the smear transfer part transfers the at least one picked smear slide whose image is to be captured from a position where the identification information is acquired to the smear-image capture apparatus, but returns the at least one picked smear slide whose image is not to be captured from the position where the identification information is acquired to an original position in the smear container where the plurality of smear slides are accommodated.

8. The slide smear system according to claim 1, wherein the first controller is further programmed to control a determination part that determines that an image of the at least one picked smear slide is to be captured by the smear-image capture apparatus on the basis of the identification information, the identification-information acquisition part further captures an image of an area in which the at least one picked smear slide is to be held by the smear transfer part, and the determination part is further programmed to determine whether the smear transfer part is holding the at least one picked smear slide on the basis of the image of the area.

9. The slide smear system according to claim 5, wherein the smear transfer part comprises a pair of gripping plates capable of gripping the at least one smear slide, an opening is formed in one of the pair of gripping plates that is in contact with a surface of the at least one smear slide where the frost section is provided, and a portion of the frost section comprises the identification information and is exposed from the opening to an outside.

10. The slide smear system according to claim 9, wherein a surface of the other one of the pair of gripping plates facing the opening, is colored such that a luminance value thereof is less than a threshold value corresponding to a lowest possible luminance value of the frost section, the first controller determines that the pair of gripping plates is gripping the at least one smear slide in response to a luminance value obtained through the opening of the one of the pair of gripping plates being equal to or more than the threshold value, and the first controller determines that the pair of gripping plates is not gripping the at least one smear slide in response to the luminance value obtained through the opening of the one of the pair of gripping plates being less than the threshold value.

11. The slide smear system according to claim 1, wherein the smear-container transport part comprises a region accessible from a user on the transport path where a smear container received from the smear preparing apparatus is transported to a position where the identification-information acquisition part in the smear transfer part acquires identification information.

12. The slide smear system according to claim 1, wherein the smear-container transport part comprises a region where a smear container accommodating a manually-prepared smear slide can be set on the transport path.

13. The slide smear system according to claim 1, wherein the smear transfer part picks the at least one picked smear slide whose image is to be captured from the smear container, puts the at least one picked smear slide in a transport case, and transfers the at least one picked smear slide in the transport case to the smear-image capture apparatus.

14. A smear transporting apparatus that transports a smear slide on which a sample is smeared to a smear-image capture apparatus, the smear transporting apparatus comprising:

a first controller programmed to control:
  a smear-container transport part to transport a smear container accommodating smear slides including at least one smear slide whose image is either to be captured by the smear-image capture apparatus or is not to be captured by the smear-image capture apparatus;
  a smear transfer part provided above the smear-container transport part to pick the at least one smear slide from the smear container; and
  an identification-information acquisition part, comprising an image capture part that captures an image of image-capturing necessity identification information of the at least one smear slide picked by the smear transfer part at an identification-information acquisition position, to acquire identification information by which the first controller determines whether a sample image is to be captured or is not to be captured by the smear-image capture apparatus, and the smear transfer part to transfer the at least one picked smear slide directly from the identification-information acquisition position to the smear-image capture apparatus in response to the first controller determining that the sample image for the at least one picked smear slide is to be captured, and to transfer the at least one picked smear slide directly from the identification-information acquisition position to a location different from the smear-image capture apparatus in response to the first controller determining that the sample image for the at least one picked smear slide is not to be captured.

15. The smear transporting apparatus according to claim 14, wherein the identification-information acquisition part acquires the identification information while the smear transfer part is holding the at least one picked smear slide after picking the smear slide from the smear container.

16. The smear transporting apparatus according to claim 15, wherein
the identification information is provided to a portion of a frost section of the at least one picked smear slide, and
the smear transfer part holds the frost section excluding the portion, enabling the identification-information acquisition part to acquire the identification information.

17. The smear transporting apparatus according to claim 15, wherein the smear transfer part transfers the at least one picked smear slide whose sample image is to be captured from a position where the identification information is acquired to the smear-image capture apparatus, and returns the at least one picked smear slide whose sample image is not to be captured from the position where the identification information is acquired to an original position in the smear container where the at least one picked smear slide has been accommodated.

18. The smear transporting apparatus according to claim 14, wherein
the first controller comprises a determination part programmed to determine whether the sample image of the at least one picked smear slide is to be captured or is not to be captured by the smear-image capture apparatus on the basis of the identification information,
the identification-information acquisition part further captures an image of an area in which the at least one picked smear slide is to be held by the smear transfer part, and
the determination part is further programmed to determine whether the smear transfer part is holding the at least one picked smear slide on the basis of the image of the area.

19. The smear transporting apparatus according to claim 15, wherein
the smear transfer part comprises a pair of gripping plates capable of gripping the at least one smear slide,
an opening is formed in one of the pair of gripping plates that is in contact with a surface of the at least one smear slide where a frost section is provided, and
a portion of the frost section comprises the identification information and is exposed from the opening to an outside.

20. A slide smear preparing apparatus comprising:
a first controller programmed to control;

a smear preparation part, which comprises a smearer and a chamber in which a smear slide is disposed, to prepare the smear slide by smearing a sample on a slide by the smearer;

an identification-information providing part, which comprises a printer, to provide, on the smear slide, image-capturing necessity identification information by which a second controller of a smear transporting apparatus determines based on image-capturing necessity identification information provided by reading the identification information from the smear slide an identification-information acquisition part at an identification-information acquisition position, whether image capturing of a sample image of the smear slide by a smear-image capture apparatus is necessary; and a smear arrangement part, which comprises a hand to grip the smear slide, to place, in a smear container, the smear slide, which further comprises smear slides comprising: a plurality of smear slides each of which is to be transferred directly from the identification-information acquisition position to the smear-image capture apparatus by the smear transporting apparatus in response to the first controller determining that the image is to be captured by the smear-image capture apparatus; and a plurality of smear slides each of which is to be transferred directly from the identification-information acquisition position to a location different from the smear-image capture apparatus by the smear transporting apparatus and in response to the first controller determining that the image is not to be captured by the smear-image capture apparatus.

21. The slide smear preparing apparatus according to claim 20, wherein the identification-information providing part provides, on the slide, sample identification information for identifying a sample and the image-capturing necessity identification information.

* * * * *